US009858680B2

(12) United States Patent
Ishihara

(10) Patent No.: US 9,858,680 B2
(45) Date of Patent: Jan. 2, 2018

(54) IMAGE PROCESSING DEVICE AND IMAGING APPARATUS

(71) Applicant: CANON KABUSHIKI KAISHA, Tokyo (JP)

(72) Inventor: Keiichiro Ishihara, Ageo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/904,060

(22) PCT Filed: Jul. 8, 2014

(86) PCT No.: PCT/JP2014/068655
§ 371 (c)(1),
(2) Date: Jan. 8, 2016

(87) PCT Pub. No.: WO2015/008717
PCT Pub. Date: Jan. 22, 2015

(65) Prior Publication Data
US 2016/0163066 A1 Jun. 9, 2016

(30) Foreign Application Priority Data

Jul. 18, 2013 (JP) .................................. 2013-149675

(51) Int. Cl.
*G06K 9/00* (2006.01)
*G06T 7/40* (2017.01)
(Continued)

(52) U.S. Cl.
CPC .......... *G06T 7/408* (2013.01); *G06K 9/00234* (2013.01); *G06K 9/00268* (2013.01);
(Continued)

(58) Field of Classification Search
CPC ... G06T 7/11; G06T 7/408; G06T 7/60; G06T 7/73; G06T 7/90; G06T 2207/10024;
(Continued)

(56) References Cited

U.S. PATENT DOCUMENTS 7,460,705 B2 * 12/2008 Nagahashi ......... G06K 9/00228
382/165
8,514,297 B2 * 8/2013 Ikeda ................. H04N 5/23219
348/223.1
(Continued)

FOREIGN PATENT DOCUMENTS

JP 7-231454 A 8/1995
JP 10-232935 A 9/1998
(Continued)

OTHER PUBLICATIONS

International Search Report and Written Opinion for PCT/JP2014/068655 and notification of transmittal of the ISR/WO, dated Oct. 27, 2014.
(Continued)

*Primary Examiner* — Jose Couso
(74) *Attorney, Agent, or Firm* — Canon USA, Inc. I.P. Division

(57) ABSTRACT

An image processing device extracts a similar color region from an image, based on at least a difference between a reference hue angle calculated based on a hue angle of pixels or small regions within a specific region of the image and the hue angle within the specific region, and a color difference between reference color space coordinates calculated based on color space coordinates of the pixels or small regions within the specific region and the color space coordinates within the specific region.

12 Claims, 28 Drawing Sheets

(51) Int. Cl.
  *G06K 9/46* (2006.01)
  *G06K 9/52* (2006.01)
  *G06K 9/62* (2006.01)
  *G06T 7/60* (2017.01)
  *G06T 7/90* (2017.01)

(52) U.S. Cl.
  CPC ......... *G06K 9/4652* (2013.01); *G06K 9/4661* (2013.01); *G06K 9/52* (2013.01); *G06K 9/6215* (2013.01); *G06T 7/60* (2013.01); *G06T 7/90* (2017.01)

(58) Field of Classification Search
  CPC ........... G06T 2207/30196; G06T 2207/30201; G06K 9/00234; G06K 9/00268; G06K 9/00369; G06K 9/00228; G06K 9/3241; G06K 9/4652; G06K 9/4661; G06K 9/52; G06K 9/6215; G06K 9/4642; G06K 9/46; G06K 9/00248; G06K 9/00281; G06K 9/00362; G06K 9/3208; G06K 2009/4666; H04N 1/628; H04N 5/23216; H04N 5/23222; H04N 9/643
  See application file for complete search history.

(56) References Cited

U.S. PATENT DOCUMENTS

| | | | | |
|---|---|---|---|---|
| 8,675,958 | B2* | 3/2014 | Abe | G03B 13/18 348/223.1 |
| 2005/0196044 | A1* | 9/2005 | Nagahashi | G06K 9/00228 382/190 |
| 2006/0126964 | A1* | 6/2006 | Chen | G06K 9/00234 382/286 |
| 2007/0085911 | A1* | 4/2007 | Nakamura | H04N 9/735 348/223.1 |
| 2007/0206093 | A1 | 9/2007 | Kuwabara et al. | |
| 2009/0252409 | A1* | 10/2009 | Saito | G06T 7/11 382/167 |
| 2010/0254597 | A1* | 10/2010 | Yen | G06T 7/11 382/164 |

FOREIGN PATENT DOCUMENTS

| | | |
|---|---|---|
| JP | 2005-115768 A | 4/2005 |
| JP | 2005-197996 A | 7/2005 |
| JP | 2006-164133 A | 6/2006 |
| JP | 2008-243059 A | 10/2008 |
| JP | 2008-252475 A | 10/2008 |
| JP | 2010-200312 A | 9/2010 |
| JP | 2011-134020 A | 7/2011 |
| JP | 2012-227914 A | 11/2012 |

OTHER PUBLICATIONS

Garcia, et al., "Face Detection Using Quantized Skin Color Regions Merging and Wavelet Packet Analysis", IEEE Transactions on Multimedia, vol. 1, No. 3, Sep. 1999, pp. 264-277.

Gong, et al., "Detection of Regions Matching Specified Chromatic Features", Computer Vision and Image Understanding, vol. 61, No. 2, Mar. 1995, pp. 263-269.

Hsu, et al., "Face Detection in Color Images", IEEE Transactions on Pattern Analysis and Machine Intelligence, vol. 24, No. 5, May 2002, pp. 696-706.

Pérez, et al., "Color-Based Probabilistic Tracking", European Conference on Computer Vision, LNCS 2350, 2002, pp. 661-675.

* cited by examiner

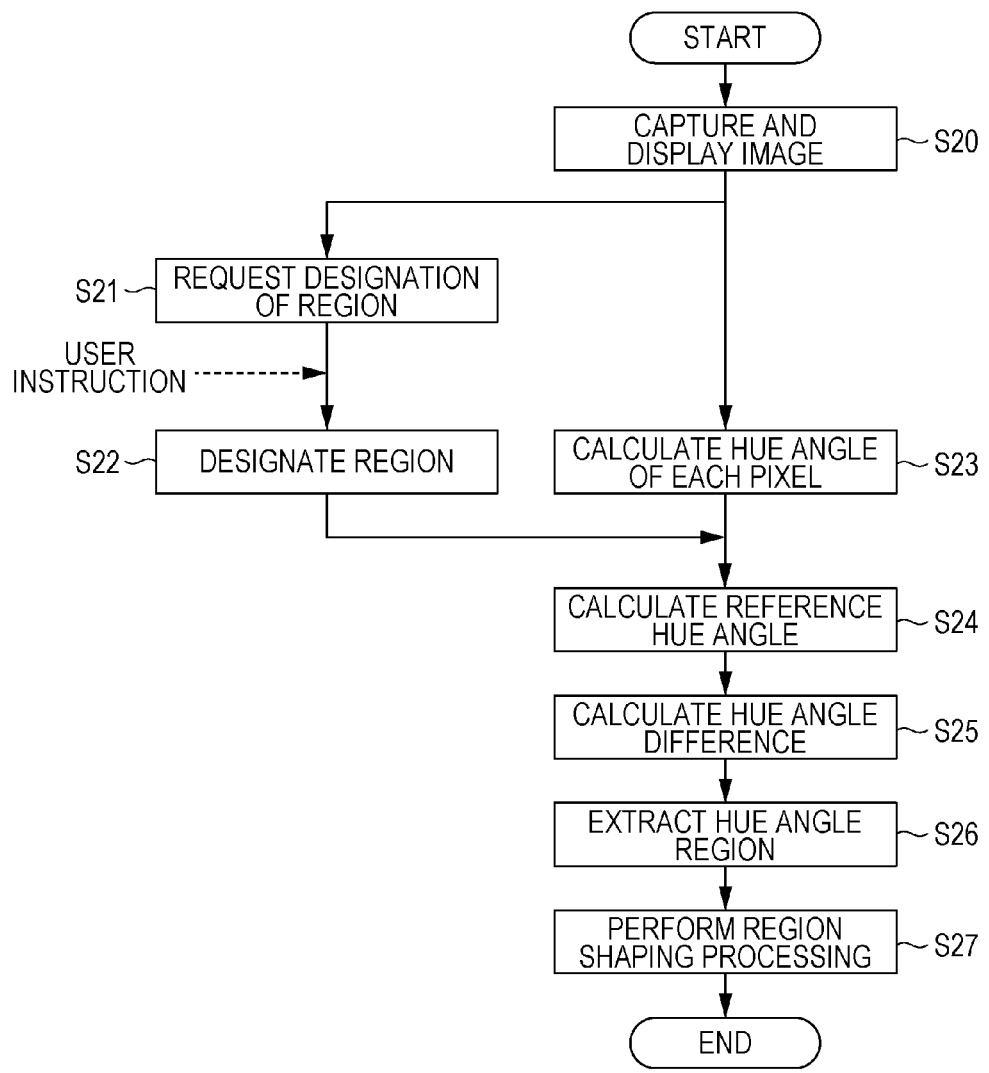

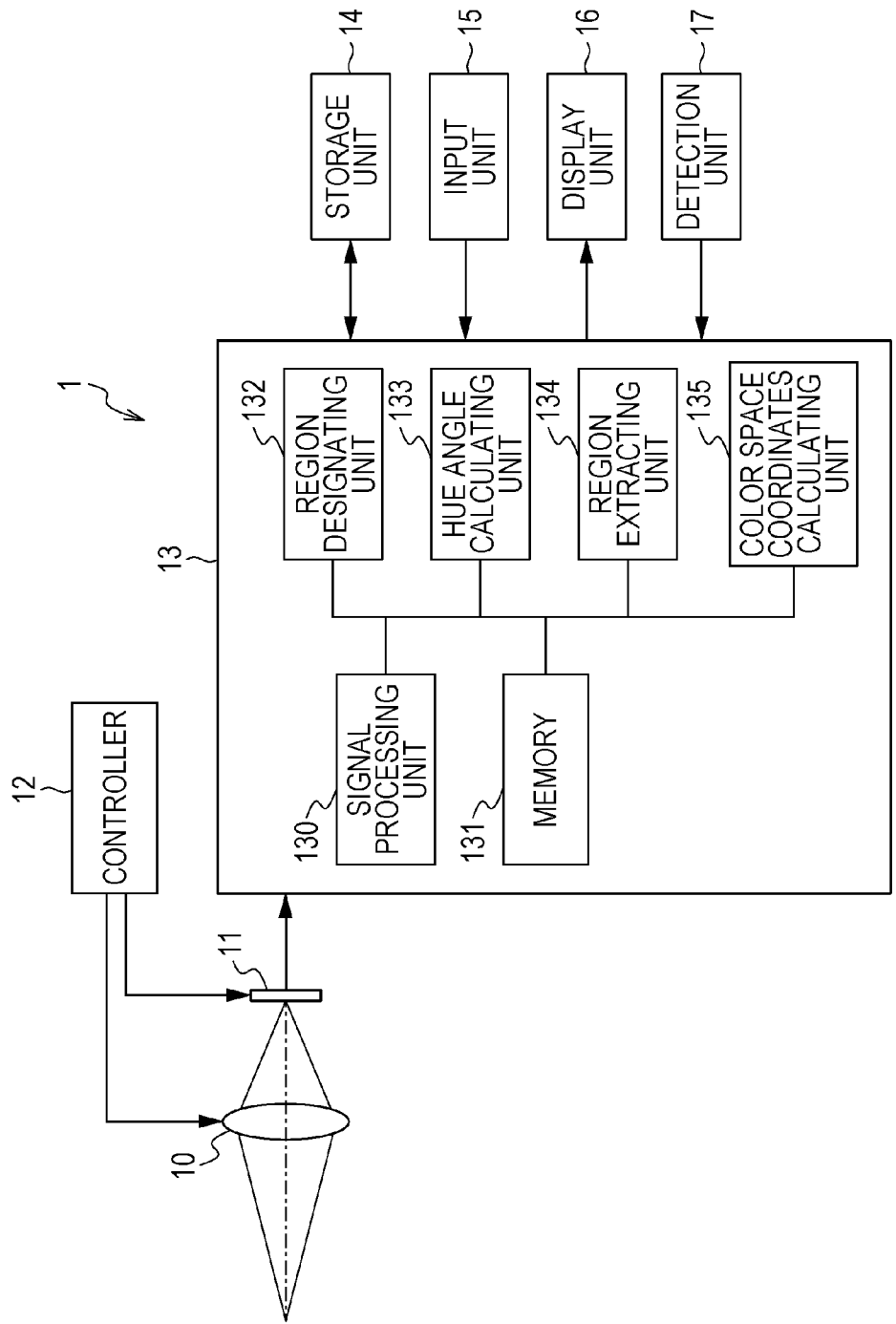

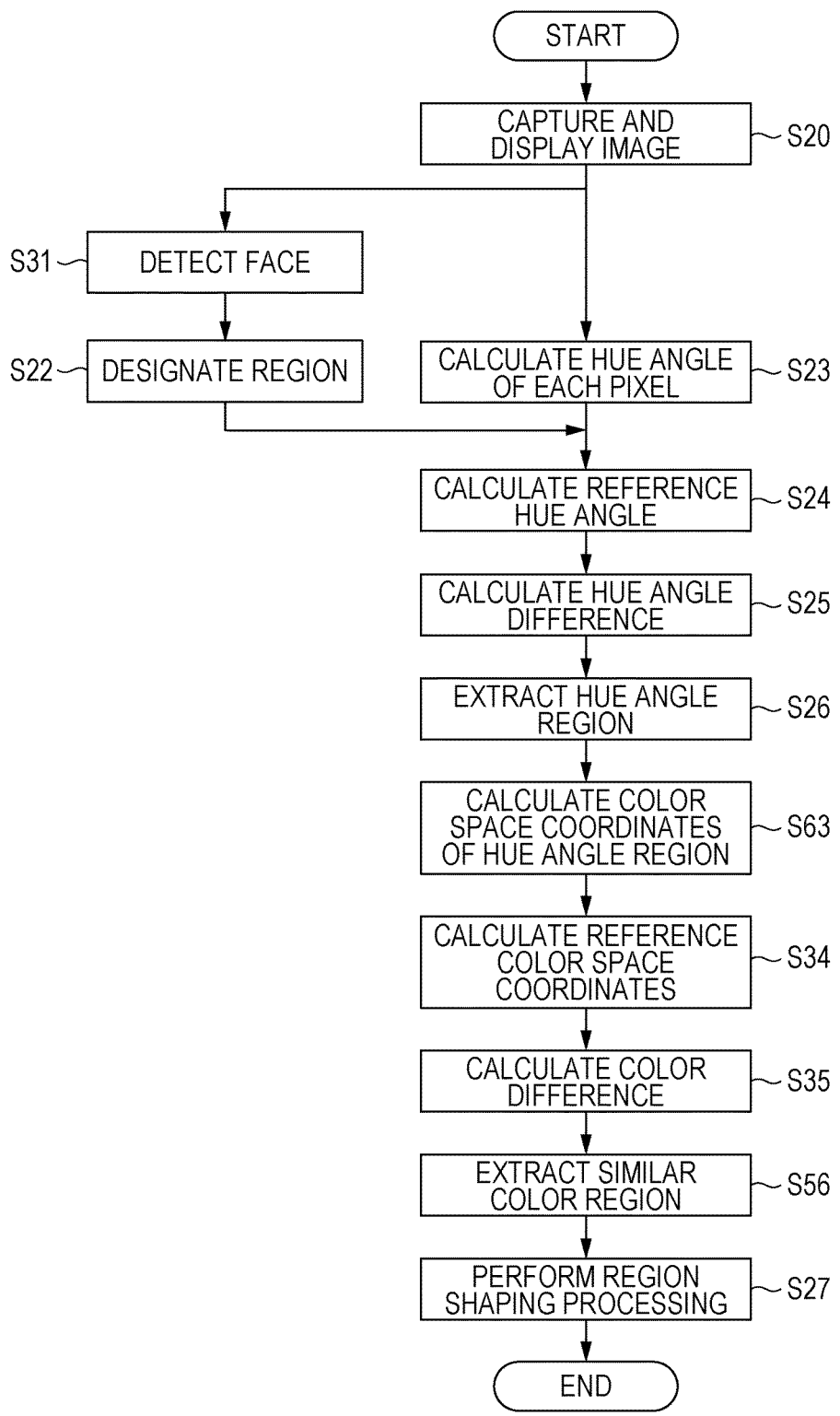

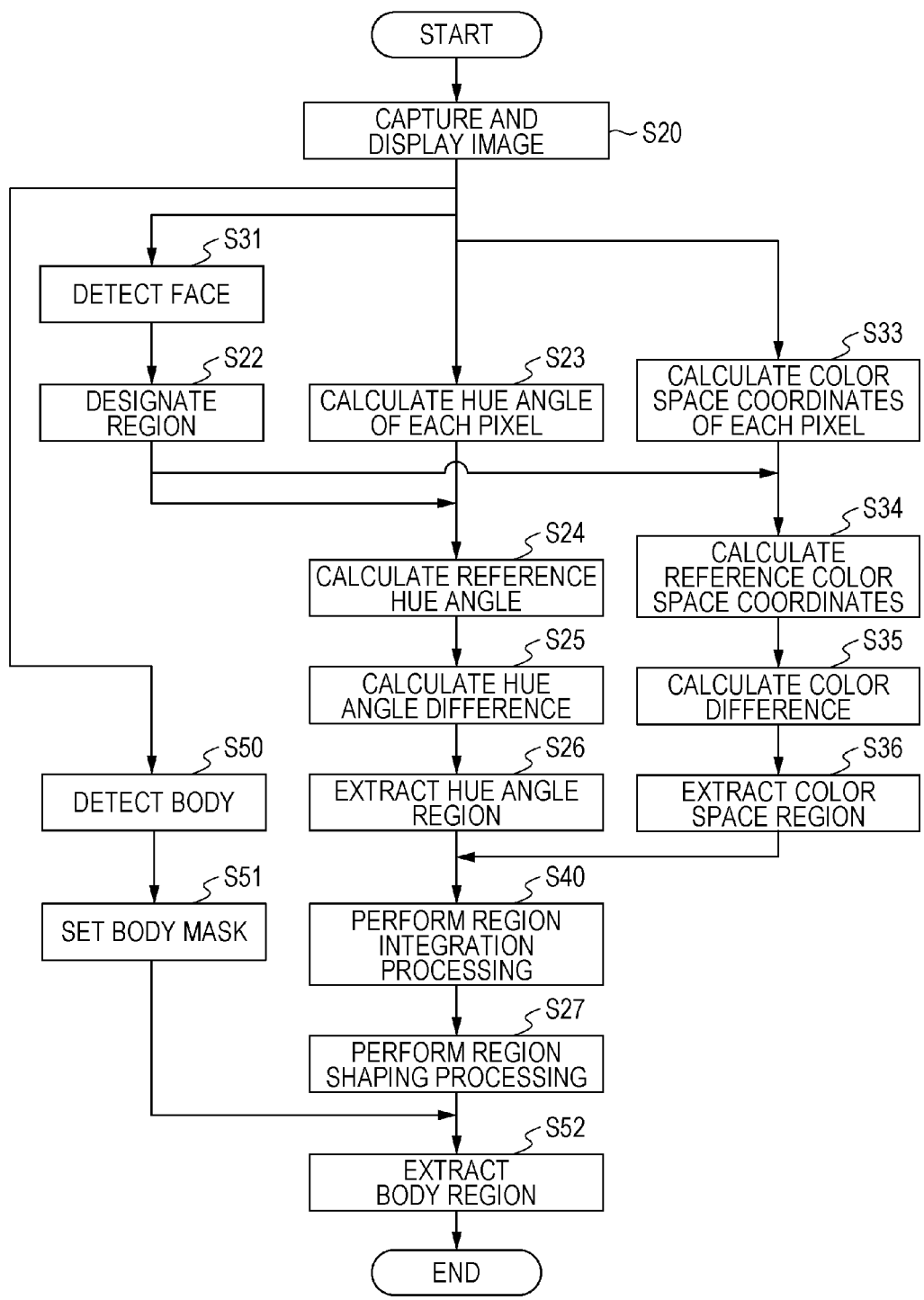

IMAGE PROCESSING DEVICE AND IMAGING APPARATUS

TECHNICAL FIELD

The present invention relates to an image processing device and an imaging apparatus.

BACKGROUND ART

Known image processing devices detect a region corresponding to a predetermined color range when detecting a region within an image.

PTL 1 discloses a method for determining whether or not a target region is a skin color region on the basis of results of a comparison between a hue determined by a color difference signal and a representative value of a hue range of a skin color and a comparison between a chroma degree determined by the color difference signal and a luminance signal.

PTL 2 discloses a method for calculating a first skin color degree based on a luminance signal and a first color difference component Cr, calculating a second skin color degree based on the luminance signal and a second color difference component (Cb+Cr), and defining a region where the first color difference component and the second color difference component fall within a specific range as a skin color region.

CITATION LIST

Patent Literature

PTL 1 Japanese Patent Laid-Open No. 7-231454
PTL 2 Japanese Patent Laid-Open No. 2008-252475

SUMMARY OF INVENTION

Technical Problem

The methods described in PTL 1 and PTL 2 determine a skin color region by making a comparison with a predetermined hue range of a skin color. Therefore, there has been a problem that a difference in skin color owing to the difference in races or individuals cannot be discerned with accuracy and false color determination may occur. However, when a color range is set broader so as to encompass such a difference in skin color, there is a problem that a color that is originally not a skin color may be wrongly determined as a skin color.

The present invention detects a similar color region with high accuracy.

Solution to Problem

According to an embodiment of the present invention, an image processing device includes a region designating unit configured to designate a specific region of an image; a hue angle calculating unit configured to calculate a hue angle of at least part of pixels or small regions within the image and calculate a reference hue angle within the specific region based on a hue angle of pixels or small regions within the specific region; a color space coordinates calculating unit configured to calculate color space coordinates of at least part of pixels or small regions within the image and calculate reference color space coordinates within the specific region based on color space coordinates of the pixels or the small regions within the specific region; and a region extracting unit configured to extract a similar color region from the image, based on at least a difference between the reference hue angle and the hue angle and a color difference between the reference color space coordinates and the color space coordinates.

According to another embodiment of the present invention, an image processing device includes a region designating unit configured to designate a specific region of an image; a hue angle calculating unit configured to calculate a hue angle of at least part of pixels or small regions within the image and calculate a reference hue angle within the specific region based on a hue angle of pixels or small regions within the specific region; a chromaticness index calculating unit configured to calculate a chromaticness index of at least part of pixels or small regions within the image and calculate a reference chromaticness index within the specific region based on a chromaticness index of pixels or small regions within the specific region; and a region extracting unit configured to extract a similar color region from the image, based on at least a difference between the reference hue angle and the hue angle and a color difference between the reference chromaticness index and the chromaticness index.

According to another embodiment of the present invention, an image processing device includes a region designating unit configured to designate a specific region of a first image; a hue angle calculating unit configured to calculate a first hue angle of at least part of pixels or small regions within the first image and calculate a reference hue angle within the specific region based on pixels or small regions within the specific region; and a region extracting unit configured to extract a first similar color region from the first image, based on at least a difference between the reference hue angle and the first hue angle. The hue angle calculating unit is configured to calculate a second hue angle of each pixel or each small region within a second image that is different from the first image. The region extracting unit is configured to extract a second similar color region from the second image, based on at least a difference between the reference hue angle and the second hue angle.

According to another embodiment of the present invention, an imaging apparatus includes an image sensor; and the image processing device mentioned above.

Advantageous Effects of Invention

With an image processing device or an image processing method according to the present invention, a similar color region may be extracted with high accuracy.

Further features of the present invention will become apparent from the following description of exemplary embodiments with reference to the attached drawings.

BRIEF DESCRIPTION OF DRAWINGS

FIG. 2 is a flowchart illustrating an example of an image processing method according to the first embodiment.

FIG. 8 illustrates an example of an imaging apparatus including an image processing device according to a third embodiment.

FIG. 11 is a flowchart illustrating an example of an image processing method according to a fourth embodiment.

FIG. 26 is a flowchart illustrating an example of an image processing method according to a tenth embodiment.

DESCRIPTION OF EMBODIMENTS

A term "reference color" used in an embodiment of the present invention indicates a "reference hue angle", "reference color space coordinates", or a "reference chromaticness index". A method for calculating the reference color will be described below.

A similar color region is a region that includes at least region (1) described below. Further, the similar color region is a region that further includes at least one of regions (2) to (6) described below. That is, for example, a similar color region may indicate a region where region (1) and region (2) overlap or may indicate a region where three or more regions, such as region (1), region (2), and region (6), overlap. Region (1) is a hue angle region which consists of pixels or small regions in which a difference between a reference hue angle and a hue angle falls within a desired range (first range). Region (2) is a color space region which consists of pixels or small regions in which a difference between reference color space coordinates and color space coordinates falls within a desired range (second range). Region (3) is a chromaticness index region which consists of pixels or small regions in which a difference between a reference chromaticness index and a chromaticness index falls within a desired range (third range). Region (4) is a region which is not a dark part region which consists of pixels or small regions in which the lightness is lower than or equal to a desired lightness. Region (5) is a lightness part region which consists of pixels or small regions in which the lightness is higher than the desired lightness. Region (6) is a region inside a mask.

A small region represents a region which consists of a plurality of pixels. For example, a small region represents a region of 5×5 adjoining pixels or a region of 3×3 pixels which are alternately arranged, just like a checkered pattern.

Hereinafter, embodiments of the present invention will be described in detail with reference to the attached drawings. However, the present invention is not limited to any of the embodiments described below. A combination of the embodiments is also included in the present invention.

First Embodiment

Figure 1:
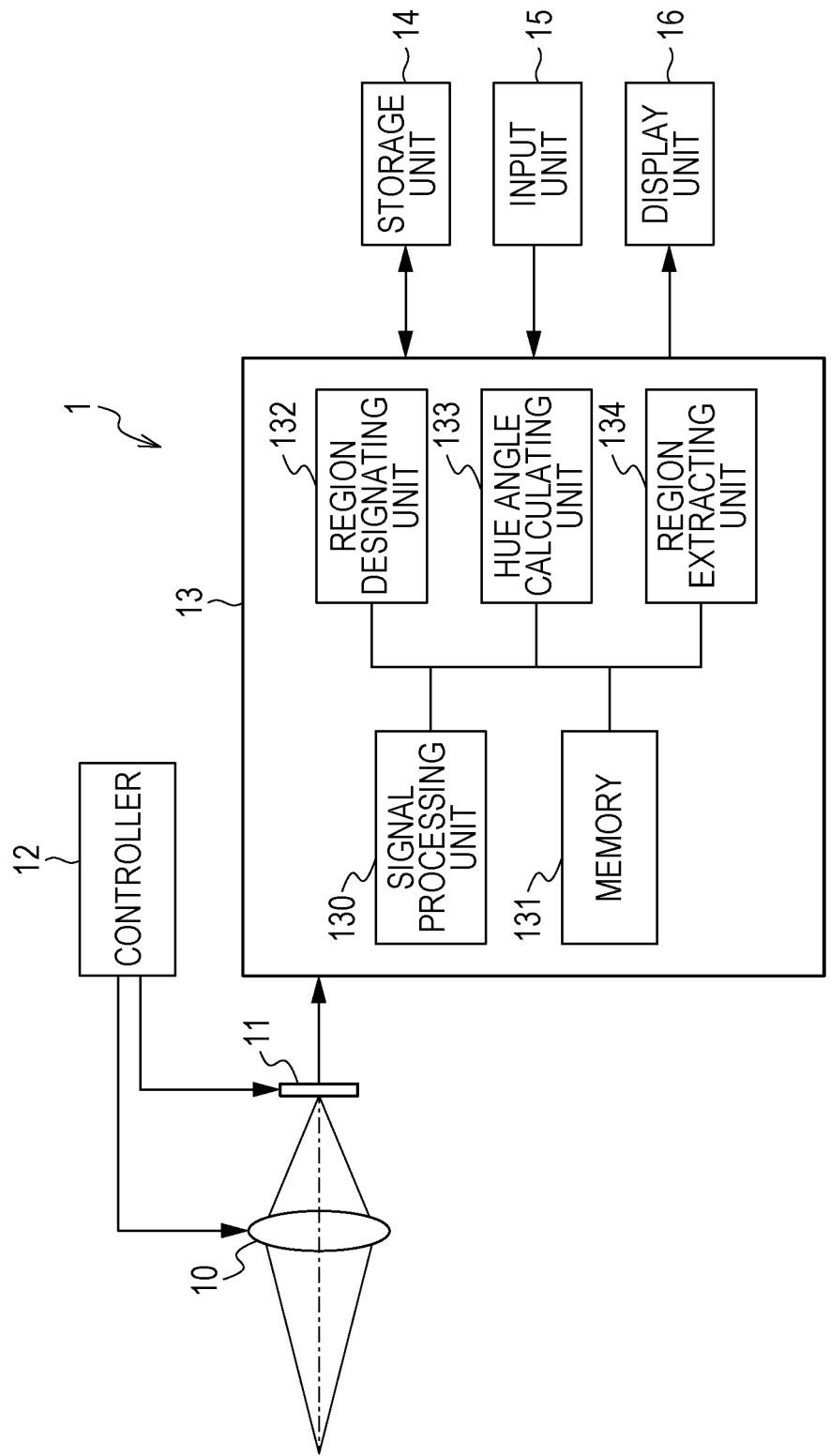
FIG. 1 illustrates an example of an imaging apparatus including an image processing device according to a first embodiment.

An imaging apparatus 1 according to a first embodiment will be described below with reference to FIG. 1. The imaging apparatus 1 includes an imaging optical system 10, an image sensor 11, a controller 12, an image processing device 13, a storage unit 14, an input unit 15, and a display unit 16.

The image processing device 13 includes a signal processing unit 130, a memory 131, a region designating unit 132, a hue angle calculating unit 133, a region extracting unit 134, and the like. The signal processing unit 130 has various signal processing functions including AD conversion and noise removal of an analog signal output from the image sensor 11, demosaicing, luminance signal conversion, color space conversion, aberration correction, white balance adjustment, and color correction. Digital image data output from the signal processing unit 130 is stored in the memory 131, and is provided for display on the display unit 16, for storage (saving) on the storage unit 14, for detection of a similar color region, and the like.

The region designating unit 132 has a function of designating a specific region from an image, for calculating a reference color in the extraction of a similar color region. A region may be designated or selected from an image by a user, or may be automatically designated by the image processing device 13. In the image processing method according to the first embodiment described later, a method for a user to designate a region will be described.

The hue angle calculating unit 133 has a function of calculating a hue angle of each pixel or each small region within an image. The hue angle calculating unit 133 also has a function of calculating, based on the hue angle of each pixel or each small region within the region designated by the region designating unit 132, a reference hue angle within the specific region. A hue angle of a small region represents a hue angle of a pixel at a gravity center position of the small region or an average value of hue angles of pixels included in the small region.

The region extracting unit 134 has a function of extracting, based on at least the difference between a reference hue angle and a hue angle of each pixel or each small region within an image, a similar color region (region (1) mentioned above) from the image. More specifically, the region extracting unit 134 includes a first extracting part (not illustrated) configured to extract from an image a hue angle region consisting of pixels or small regions in which the difference between the reference hue angle and the hue angle of each pixel or each small region within the image falls within a desired range (first range). With the functions described above, pixels having a hue angle similar to the reference hue angle of the specific region designated by the region designating unit 132 may be extracted as a similar color region from the entire image.

Even the same color of the same material could look different when it is shadowed and dulled. In an embodiment of the present invention, in order to categorize regions of the same material into the same color region, it is necessary to extract both a region on which illumination light falls (a region with no shadow) and a shadowed region. In an embodiment of the present invention, a hue angle is used for determining a color. A hue angle is less likely to be affected by a change in chroma (dullness), and regions of the same material may be easily extracted based on the hue angle. Therefore, according to the first embodiment, it is possible to extract a similar color region with high accuracy. For determination of a similar color, only a hue angle may be used. Alternatively, a combination of two or more a hue angle, color space coordinates, and lightness information may be used, as in an embodiment described later.

In an embodiment of the present invention, by calculating a reference hue angle based on a hue angle of each pixel or each small region within a specific region 40 designated in processing S22, even in the case where, for example, there is a difference in skin color due to different races or different individuals, a skin color region of individuals may be extracted as a similar color region.

The imaging optical system 10 is configured to include a plurality of lenses and is an optical system that forms an image of incident light on an image surface of the image sensor 11. For the imaging optical system 10, a variable-focus optical system is used which is capable of automatic focusing with an autofocus function of the controller 12. For automatic focusing, either a passive method or an active method may be used. The image sensor 11 is an image sensor that includes an image sensor, such as a charge-coupled device (CCD) or a metal oxide semiconductor (MOS). The image sensor 11 may include a color filter or may be a monochrome image sensor or a three-plate image sensor.

The controller 12 has a function of controlling individual units of the imaging apparatus 1. Other functions of the controller 12 include, for example, automatic focusing by autofocus (AF), changing of a focus position, changing of an F-number (aperture), image capturing, and controlling of a shutter and flash (not illustrated).

The storage unit 14 is a nonvolatile storage medium which stores photographed image data, parameter data used in the imaging apparatus 1, and the like. For the storage unit 14, any type of large-capacity storage medium may be used as long as it is able to perform high-speed reading and writing. For example, a flash memory is desirable.

The input unit 15 is an interface with which a user performs input for designating a region for calculation of a reference color (reference hue angle) and input for setting a mask. For example, a dial, a button, a switch, a touch panel, or the like may be used as an interface. For the display unit 16, for example, a display device, such as a liquid crystal display or an organic electroluminescence (EL) display, may be used. The display unit 16 is used for confirming composition at the time of photographing, browsing a photographed and recorded image, displaying various setting screens and message information, displaying a designated region for calculating a reference color (a reference hue angle), displaying a mask, and the like.

Figure 3A:
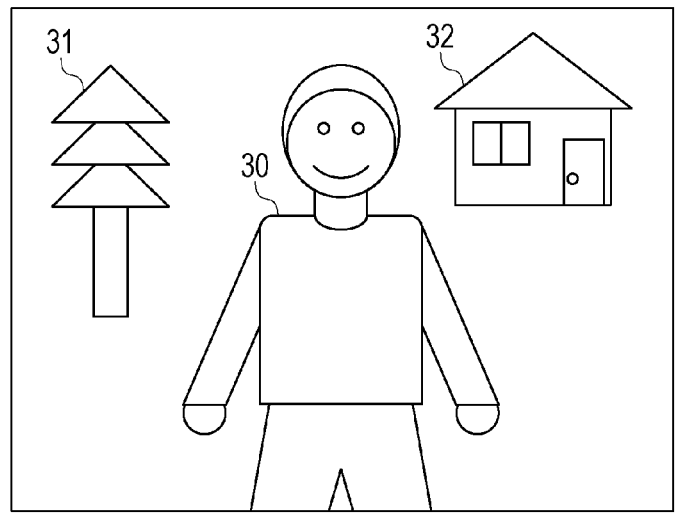
FIGS. 3A, 3B and 3C illustrate designation of a region and extraction of a similar color region according to the first embodiment.
Figure 3B:
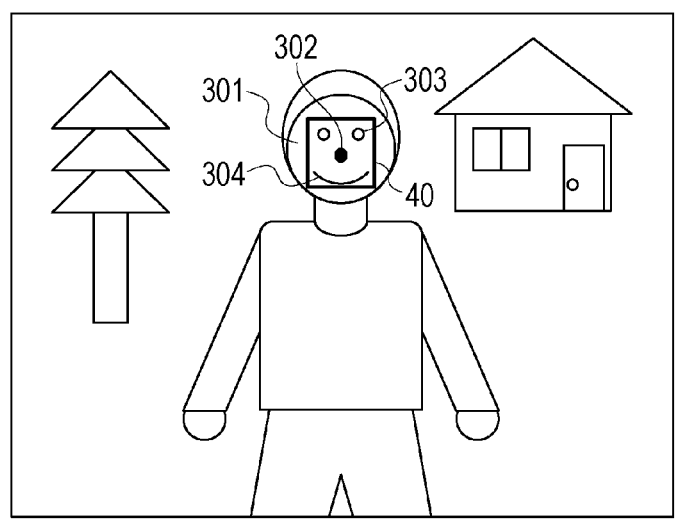
Figure 3C:
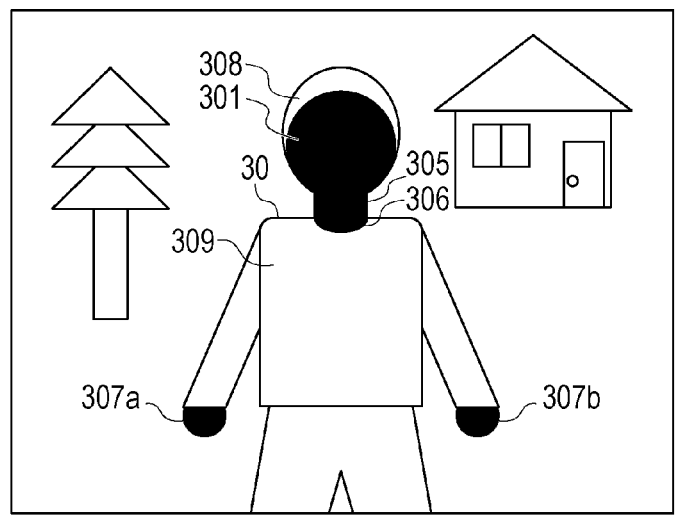

An image processing method for use in the image processing device 13 according to the first embodiment will be described below with reference to FIGS. 2, 3A, 3B, and 3C. FIG. 2 is a flowchart illustrating the image processing method according to the first embodiment. FIGS. 3A, 3B, and 3C are a schematic diagram of an acquired image, an explanatory diagram of region designation, and a diagram illustrating a result of extraction of a similar color region, respectively.

When a user operates the input unit 15 to issue an instruction to execute extraction of a similar color region, capturing of an image by the image sensor 11 starts, and captured images are sequentially displayed on the display unit 16 via the signal processing unit 130 and the memory 131 (S20). FIG. 3A illustrates an example of an image displayed on the display unit 16. A person 30, a tree 31, and a house 32 are included in the image.

Next, the region designating unit 132 requests the user to designate a region for calculation of a reference hue angle (S21). For example, a guide message, such as "Touch a point to be used for a reference color", is displayed on the display unit 16 so as to be superimposed on the image of FIG. 3A. When the user touches (designates) an arbitrary point on the image (in the example of FIG. 3B, a center point 302 of a face 301 of the person 30), the region designating unit 132 designates the specific region 40 for calculation of a reference hue angle so as to be centered on the center point 302 (S22).

Meanwhile, the hue angle calculating unit 133 reads an image taken into the memory 131, and calculates a hue angle of each pixel or each small region of the entire image (S23). Then, the hue angle calculating unit 133 calculates a reference hue angle within the specific region 40, based on the hue angle of the pixels or small regions included in the specific region 40 designated in processing S22 (S24).

A reference hue angle may be obtained, for example, in a method of calculating the average value of pixels with the most likely hue angles within the specific region 40. Specifically, first, the average value of hue angles of all the pixels included in the specific region 40 is obtained, and then, the average value of only the pixels with the hue angles close to the obtained average value is obtained again. The newly obtained average value is defined as a reference hue angle. With the use of this method, noise, such as black of an eye 303 and red of a mouth 304, which have hue angles greatly different from a facial skin color, may be removed, and the original hue angle of the facial skin color of the object may be accurately calculated.

Next, the first extracting part of the region extracting unit 134 calculates the difference (hue angle difference) between the hue angle of each pixel or each small region obtained in processing S23 and the reference hue angle obtained in processing S24 (S25). Then, the first extracting part extracts, as a hue angle region, pixels in which the hue angle difference falls within the first range (S26). A range where the absolute value of the hue angle difference is smaller than or equal to 35 (deg) in terms of CIE 1976 (L*a*b*) color system is defined as the first range.

Then, for the extracted hue angle region, region shaping processing, such as filling in the voids generated by the eye and mouth excluded in processing S24, is performed (S27).

FIG. 3C illustrates a result of extraction of the hue angle region as a similar color region. Exposed skin parts of the person 30 as an object, such as the face 301, a neck 305, a chest part 306, a right hand first 307a, and a left hand first 307b, are extracted as the similar color region (black parts). In contrast, hair of a head 308, clothing of a body 309, and the like are not included in the similar color region and therefore they are not extracted.

Thus, by extracting a similar color region having a color (hue angle) the same as or similar to the region designated by the user, it is possible to collectively extract, for example, regions of exposed skin parts of a person. Further, it is possible to automatically extract the same object in units of pixels, without requiring the user to find out the outline of the object.

The similar color region obtained here can be utilized, for example, in processing for extracting the same object, processing for extracting a skin color region, image processing for making skin look nice in the skin color region, and the like.

For a hue angle used in an embodiment of the present invention, H* (deg) in a CIE Lab color system (L*a*b* color system) expressed by Equation 1 may be used.

$$H^* = \tan^{-1}\left(\frac{b^*}{a^*}\right) \quad \text{[Math. 1]}$$

For a hue angle used in an embodiment of the present invention, a hue angle H* (deg) in a CIE Luv color system (L*u*v* color system) expressed by Equation 2 may be used.

$$H^* = \tan^{-1}\left(\frac{v^*}{u^*}\right) \quad \text{[Math. 2]}$$

For a hue angle used in an embodiment of the present invention, a hue angle H (deg) in a YUV color system expressed by Equation 3 may be used.

$$H = \tan^{-1}\left(\frac{V}{U}\right) \quad \text{[Math. 3]}$$

For a hue angle used in an embodiment of the present invention, a hue angle H (deg) in a YCbCr color system expressed by Equation 4 may be used.

$$H = \tan^{-1}\left(\frac{Cr}{Cb}\right) \quad \text{[Math. 4]}$$

For a hue angle used in an embodiment of the present invention, a hue angle H (deg) in a YPbPr color system expressed by Equation 5 may be used.

$$H = \tan^{-1}\left(\frac{Pr}{Pb}\right) \quad \text{[Math. 5]}$$

For a hue angle used in an embodiment of the present invention, a hue angle H (deg) in an RGB color space expressed by Equation 6 may be used.

$$H = \tan^{-1}\left[\frac{\sqrt{3}(G-B)}{2R-G-B}\right] \quad \text{[Math. 6]}$$

Figure 4:
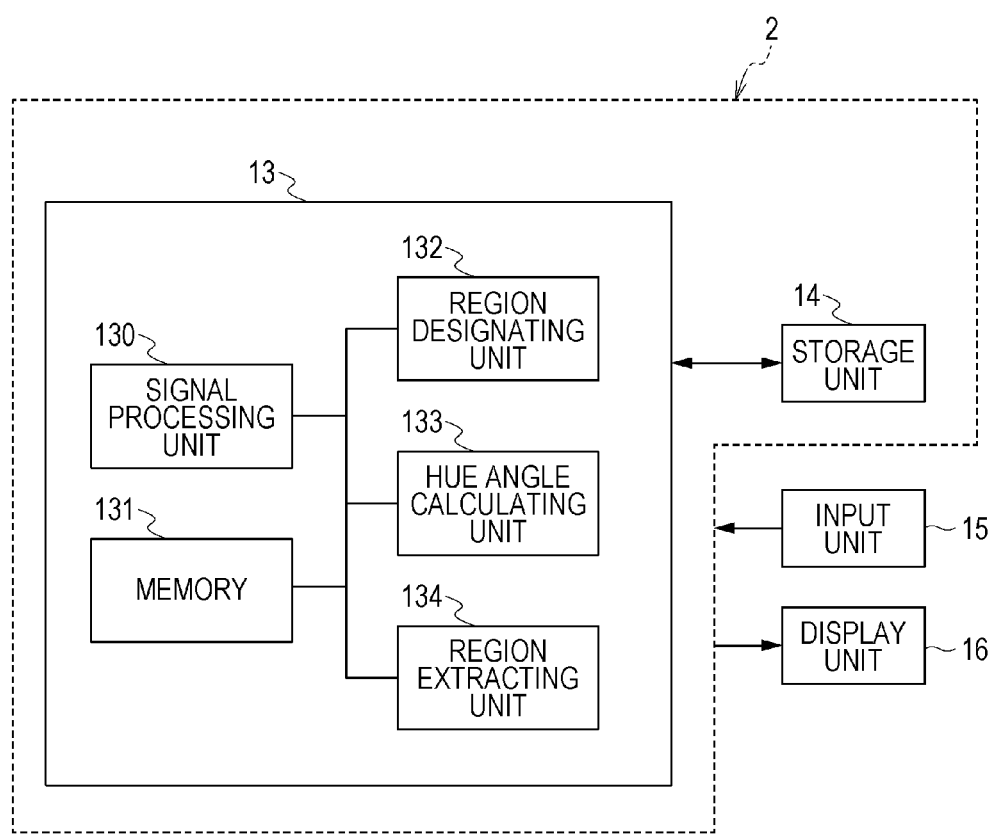
FIG. 4 illustrates a configuration example of a computer according to the first embodiment.

The image processing device according to the first embodiment can also be used for a computer. FIG. 4 illustrates a schematic configuration of a computer 2 which includes the image processing device 13 according to the first embodiment. The computer 2 also includes, in addition to the image processing device 13, the above-mentioned storage unit 14. The input unit 15 and the display unit 16 in FIG. 4 may have the above-mentioned configuration. The computer 2 may be a personal computer or a server in a cloud environment.

Second Embodiment

Next, a second embodiment will be described. The second embodiment differs from the first embodiment in that an imaging apparatus receives face detection information from a detection unit and designates a specific region based on the face detection result. Hereinafter, parts different from the first embodiment will be mainly described.

Figure 5:
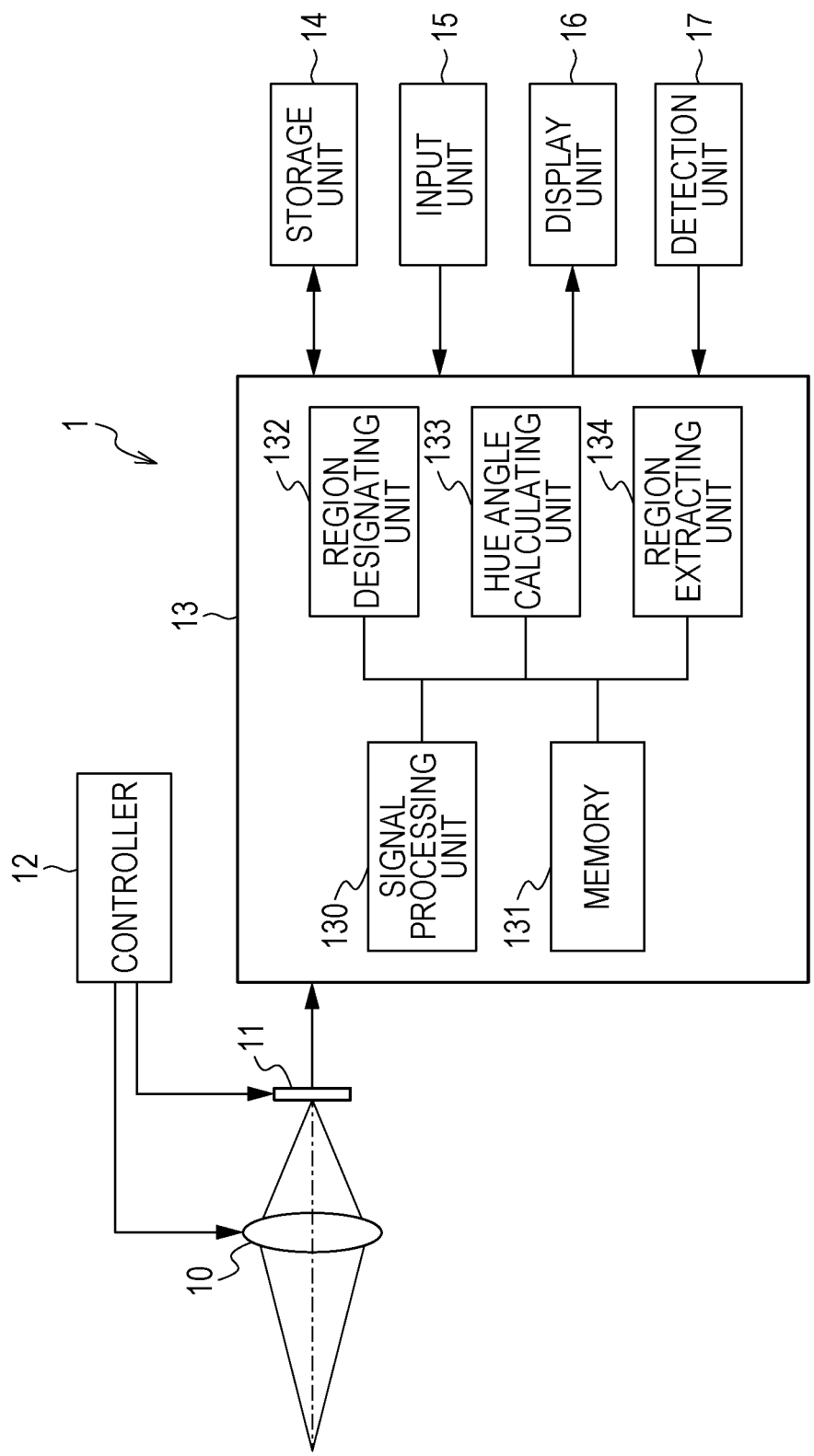
FIG. 5 illustrates an example of an imaging apparatus including an image processing device according to a second embodiment.

FIG. 5 illustrates a schematic configuration of the imaging apparatus 1 including the image processing device 13 according to the second embodiment. The imaging apparatus 1 includes, in addition to the components of the imaging apparatus 1 according to the first embodiment, a detection unit 17. Specifically, in the second embodiment, the detection unit 17 has a function of detecting a face.

Face detection processing is a function of detecting a position, orientation, and size of a face of a human or an animal, based on the positional relationship of face parts, such as eyes, a nose, and a mouth, in an image. With the face detection processing, it is possible to grasp an approximate position of a face. However, it is difficult to grasp the outline of the face in units of pixels. In the second embodiment, the detection unit 17 is used as a unit configured to automatically input the position of a face, and based on the face detection result, a region is designated for calculating a reference hue angle.

Figure 6:
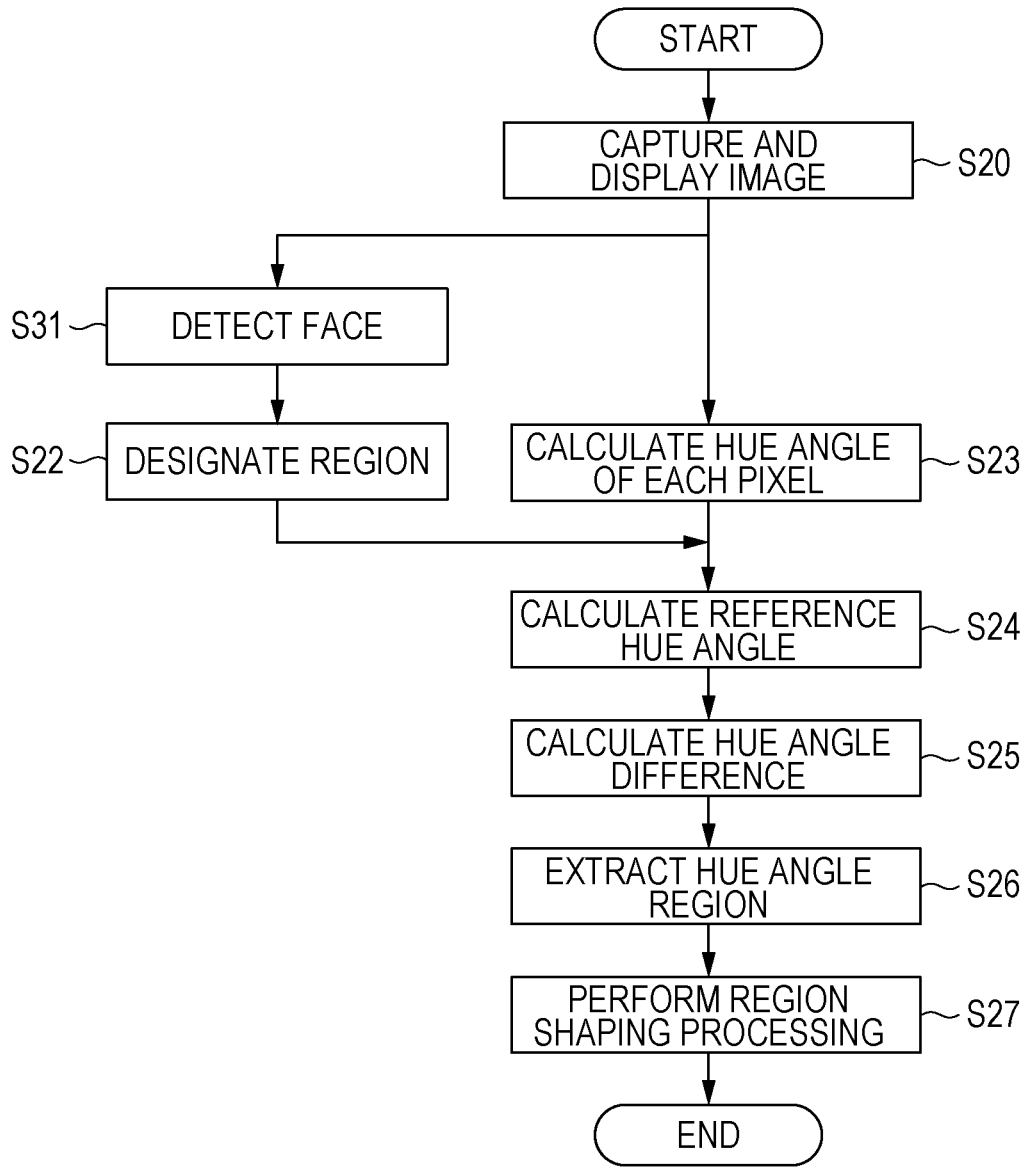
FIG. 6 is a flowchart illustrating an example of an image processing method according to the second embodiment.
Figure 7A:
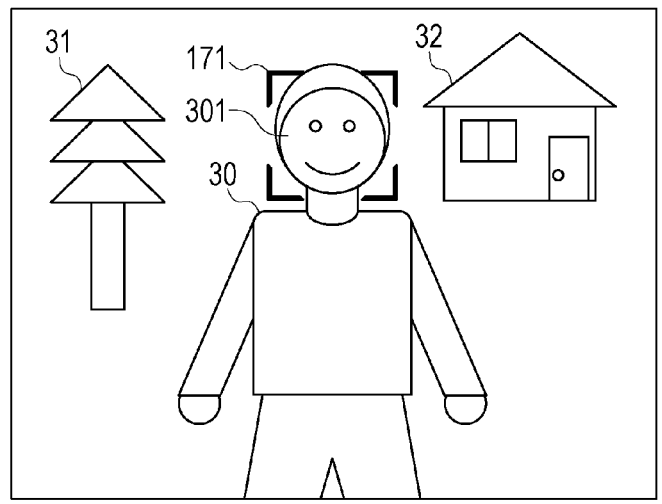
FIGS. 7A, 7B, and 7C illustrate designation of a region and extraction of a similar color region according to the second embodiment.
Figure 7B:
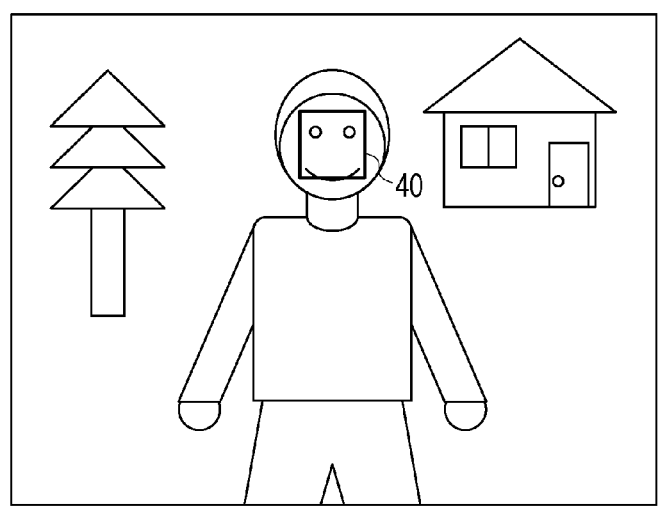
Figure 7C:
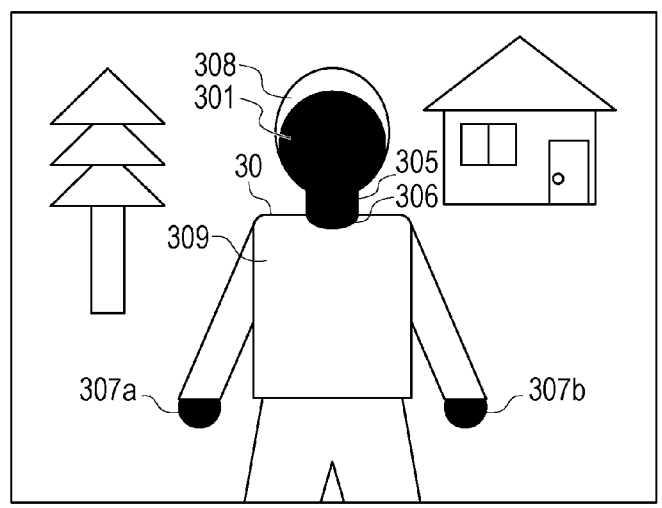

FIG. 6 is a flowchart illustrating an image processing method according to the second embodiment. FIGS. 7A, 7B, and 7C respectively illustrate a face detection result, an explanation of region designation, and an extraction result of a similar color region (hue angle region).

As illustrated in FIG. 6, in the second embodiment, face detection is performed by the detection unit 17 of the imaging apparatus 1 (S31), instead of requesting a user to designate a region. More specifically, as illustrated in FIG. 7A, when face detection processing (S31) is executed, a face detection result is displayed as a face detection frame 171 on the display unit 16. The face detection result is displayed as the central coordinates of the face detection frame 171 and the face detection frame 171, which has a square shape, and the outline of a face is not expressed in units of pixels.

Further, the face detection frame 171 is set slightly greater than the face 301 in the image.

Then, based on the face detection result, the region designating unit 132 designates the specific region 40 (S22). As illustrated in FIG. 7B, in processing S22, the specific region 40 of a size which falls within the area of the face 301 in the image is designated, by using a frame smaller than the area of the face detection frame 171 and the central coordinates of the face detection frame 171. Description of processing S23 to S27 will be omitted as they are the same as those in the first embodiment.

In FIG. 7C, exposed skin parts of the person 30 as an object, such as the face 301, the neck 305, the chest part 306, the right hand first 307a, and the left hand first 307b, are extracted as a similar color region (black parts). In contrast, hair of the head 308, clothing of the body 309, and the like are not included in the similar color region and therefore they are not extracted.

According to the second embodiment, it is possible to automatically extract a similar color region of an object in units of pixels, without requiring a user to find out the outline of the object. Further, since a similar color region (region (1) mentioned above) is extracted based on a hue angle, even if the skin color is shadowed and dulled, the hue angle of the same skin color can be identified.

In the case where face detection results for a plurality of people are obtained from an image including a plurality of people, specific regions may be designated for the individual faces based on the respective face detection results, the reference hue angles may be calculated for the respective skin colors, and similar color regions for the respective people may be extracted. Thus, even if there is a difference in skin color owing to the difference in races, individuals, or lighting environment, it is possible to extract skin colors for respective individuals with high accuracy and extract similar color regions for the respective individuals.

Third Embodiment

A third embodiment differs from the second embodiment in that a region is extracted based on two types of color information: a hue angle region and a color space region. Hereinafter, parts different from the second embodiment will be mainly described.

FIG. 8 illustrates a schematic configuration of the imaging apparatus 1 including the image processing device 13 according to the third embodiment. The imaging apparatus 1 includes, in addition to the components of the imaging apparatus 1 according to the second embodiment, a color space coordinates calculating unit 135. The color space coordinates calculating unit 135 calculates color space coordinates of each pixel or each small region within an image, and calculates reference color space coordinates of a specific region based on the calculated color space coordinates. The region extracting unit 134 includes, in addition to the first extracting part (not illustrated) configured to extract the above-mentioned hue angle region, a second extracting part (not illustrated) configured to extract a color space region which consists of pixels or small regions in which the color difference between the reference color space coordinates and the color space coordinates falls within the second range.

Figure 9:
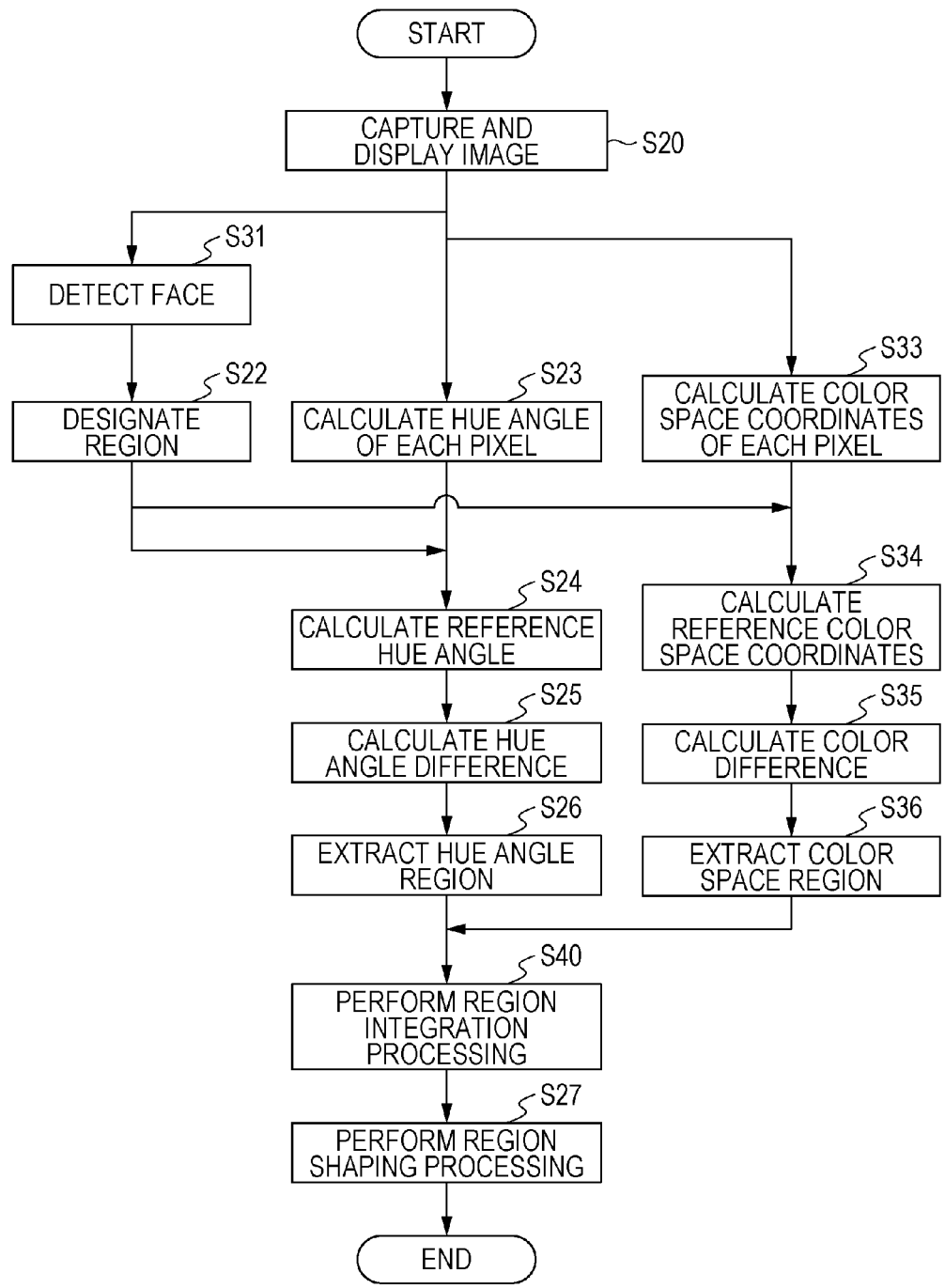
FIG. 9 is a flowchart illustrating an example of an image processing method according to the third embodiment.

FIG. 9 is a flowchart illustrating an image processing method according to the third embodiment. In the image processing method according to the third embodiment, the description of processing S31 and S22 to S26 will be omitted as they are the same as those in the second embodiment.

The color space coordinates calculating unit 135 calculates color space coordinates of each pixel or each small region from an image captured in processing S20 (S33). Further, the color space coordinates calculating unit 135 calculates reference color space coordinates within a specific region based on hue angles of pixels included in the specific region designated in processing S22.

Then, the second extracting part of the region extracting unit 134 obtains a color difference from the color space coordinates of each pixel or each small region calculated in processing S33 and the reference color space coordinates calculated in processing S34 (S35). The second extracting part extracts, as a color space region, a collective region of pixels in which the color difference falls within a specific range (second range) (S36).

Further, the region extracting unit 134 performs region integration processing for extracting, as a similar color region, a region where the hue angle region extracted in processing S26 and the color space region extracted in processing S36 overlap, from the image (S40). Furthermore, the region extracting unit 134 performs region shaping processing such as filling in a void (S27).

Figure 10A:
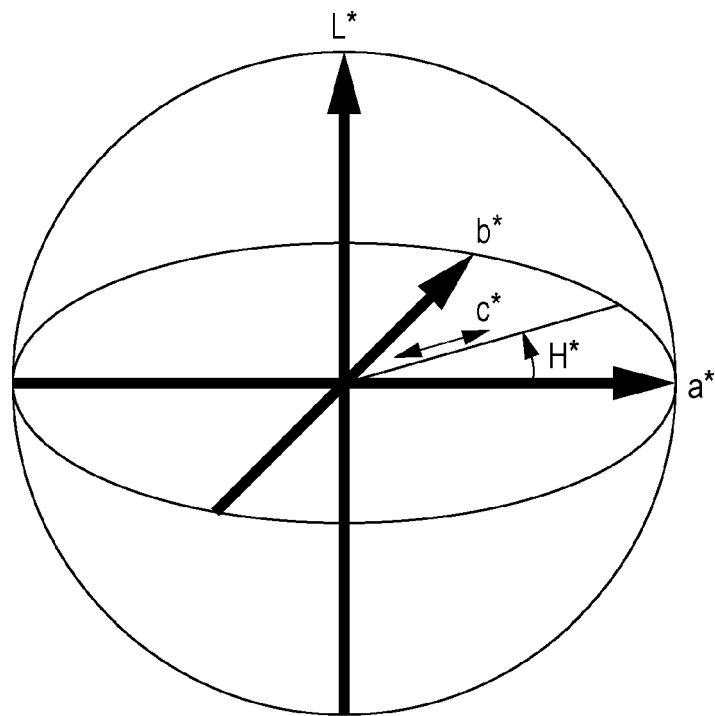
FIGS. 10A and 10B illustrate a three-dimensional color space and a similar color region according to the third embodiment.
Figure 10B:
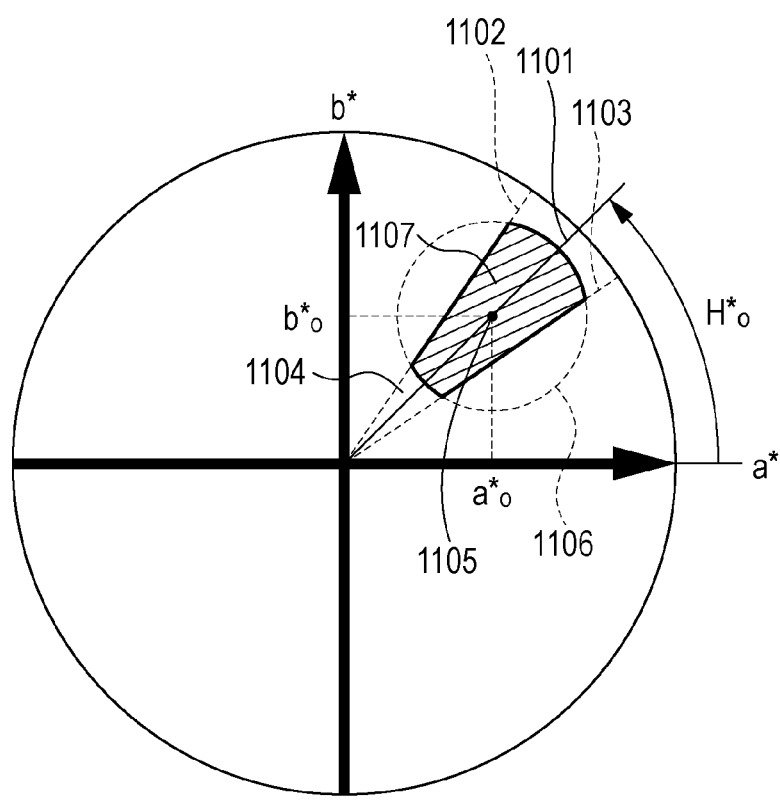

A three-dimensional color space and a range of a similar color region according to the third embodiment will be described in details with reference to FIGS. 10A and 10B. FIG. 10A illustrates a three-dimensional color space in the L*a*b* color system. FIG. 10B illustrates an a*b* sectional view at a lightness index L* in the L*a*b* color system.

As illustrated in FIG. 10A, the three-dimensional color space in the L*a*b* color system is a three-dimensional color space expressed as a sphere, in which an axis representing the lightness index L* and axes representing the chromaticness indices a* and b* are orthogonal to each other. A hue angle H* represents an angle, in the a*b* sectional view, formed by the axis a* and a line that connects the color space coordinates (a*,b*) and the intersection of the axis a* and the axis b*. A chroma C* represents a distance, in the a*b* sectional view, between color space coordinates (a*,b*) and the intersection of the axis a* and the axis b*. A color difference represents a distance between first color space coordinates ($L^*_1, a^*_1, b^*_1$) and second color space coordinates ($L^*_2, a^*_2, b^*_2$). In the third embodiment, either the first color space coordinates or the second color space coordinates corresponds to the color space coordinates of each pixel or each small region and the other corresponds to the reference color space coordinates.

In the reference hue angle calculation processing (S24), a reference hue angle within the region designated in the region designation processing (S22) is calculated. This reference hue angle is represented as $H^*_o$ in FIG. 10B. In the three-dimensional color space, the reference hue angle indicates a plane including a line 1101 and stretching in the direction of the axis L*.

In the hue angle extraction processing (S26), a region corresponding to hue angles which fall within a threshold with respect to the reference hue angle $H^*_o$ is extracted. Specifically, the threshold is ±35 (deg), and the first range is a range where an absolute value of the hue angle difference is 35 (deg) or less. More specifically, the first range is a range where a hue angle H* is equal to or greater than $H^*_o - 35$ (deg) and smaller than or equal to $H^*_o + 35$ (deg). In FIG. 10B, the range of hue angles between a line 1102, which is +35 (deg) with respect to the line 1101, and a line 1103, which is −35 (deg) with respect to the line 1101, is defined as a similar hue angle range 1104. In the three-dimensional color space, the similar hue angle range 1104, which has a fan shape, stretches in the direction of the axis L*.

In the reference color space coordinates calculation processing (S34), reference color space coordinates in the specific region designated in the region designation processing (S22) are calculated. The reference color space coordinates ($L^*_o, a^*_o, b^*_o$) are expressed by a point 1105 in FIG. 10B. In the color space region extraction processing (S36), pixels in which the distance (color difference) between the reference color space coordinates ($L^*_o, a^*_o, b^*_o$) and color space coordinates ($L^*_i, a^*_i, b^*_i$) of each pixel or each small region falls within the second range, are extracted. Specifically, a range where the absolute value of the color difference $\Delta E^*ab$ between the reference color space coordinates and the color space coordinates in terms of CIE 1976 ($L^*a^*b^*$) color system is smaller than or equal to 45 is defined as the second range. In FIG. 10B, a similar color space range 1106 included in the second range is a circle, and the range is a sphere in actuality in the three-dimensional color space.

In the region integration processing (S40), pixels corresponding to an integration region 1107 where a collective region of pixels having hue angles within the similar hue angle range 1104 and a collective region of pixels having color space coordinates within the similar color space range 1106 overlap, are extracted. In FIG. 10B, the integration region 1107 is represented as an area hatched by oblique lines, and in the color space, it has a three-dimensional shape.

Thus, in the third embodiment, two types of color information that are different in nature: a hue angle and a color difference, are used. Therefore, a similar color region (a region where region (1) and region (2) mentioned above overlap) can be extracted with high accuracy. When detection is performed based on a hue angle, the chroma direction is tolerated. Accordingly, even if the chroma of a shadowed and dulled part is decreased because of the surface unevenness of an object, the same hue angle may be identified. A color difference represents how human beings sense color differently. In the third embodiment, a range in which chroma or lightness does not extremely deviate from the reference color space is extracted. Thus, the capability of identifying similar colors in the same object is enhanced, and a similar color region may be extracted with high accuracy.

In the third embodiment, a color difference is described using the CIE 1976 ($L^*a^*b^*$) color system and the color difference $\Delta E^*ab$. However, the color difference is not limited to this. For example, a color difference $\Delta E^*uv$ in the CIE 1976 ($L^*u^*v^*$) color system or a color difference $\Delta E00$ in the CIE 2000 color system may be used. In particular, since the color difference $\Delta E00$ in the CIE 2000 color system takes into consideration chroma dependency, hue angle dependency, and lightness dependency, the color difference $\Delta E00$ in the CIE 2000 color system may be preferably used.

The use of a color difference enables simultaneous extraction of ranges in which chroma or lightness does not extremely deviate from the reference color space. However, instead of a color difference, chroma identifying processing and lightness identifying processing may be provided separately.

In the reference color space calculation processing (S33), a desired reference color space with noise removed is preferably obtained.

Fourth Embodiment

In a fourth embodiment, a difference from the third embodiment will be described in which a similar color region consisting of pixels or small regions in which a difference between a reference hue angle and a hue angle falls within a desired range and in which a difference (color difference) between reference color space coordinates and color space coordinates falls within a desired range is extracted.

For example, an image processing method illustrated in FIG. 11 may be used. Description of processing S20, S31, and S22 to S26 will be omitted as they are the same as those in the third embodiment.

Next, the color space coordinates calculating unit 135 calculates color space coordinates of each pixel or each small region of the hue angle region extracted in processing S26 (S63), instead of calculating color space coordinates of each pixel or each small region within an image. Further, the color space coordinates calculating unit 135 calculates reference color space coordinates of the hue angle region, based on the color space coordinates calculated in processing S63 (S34). In this example, unlike the third embodiment, the color space coordinates calculating unit 135 has a function of calculating color space coordinates of each pixel or each small region within a hue angle region and calculating reference color space coordinates of the hue angle region based on the calculated color space coordinates.

Then, the region extracting unit 134 obtains a color difference based on the color space coordinates of each pixel or each small region calculated in processing S63 and the reference color space coordinates calculated in processing S34 (S35). Next, the region extracting unit 134 extracts, as a similar color region, a region consisting of pixels or small regions in which the color difference falls within in the above-mentioned second range, from the hue angle region (S56). Furthermore, the region extracting unit 134 performs region shaping processing such as filling in a void (S27).

Figure 12:
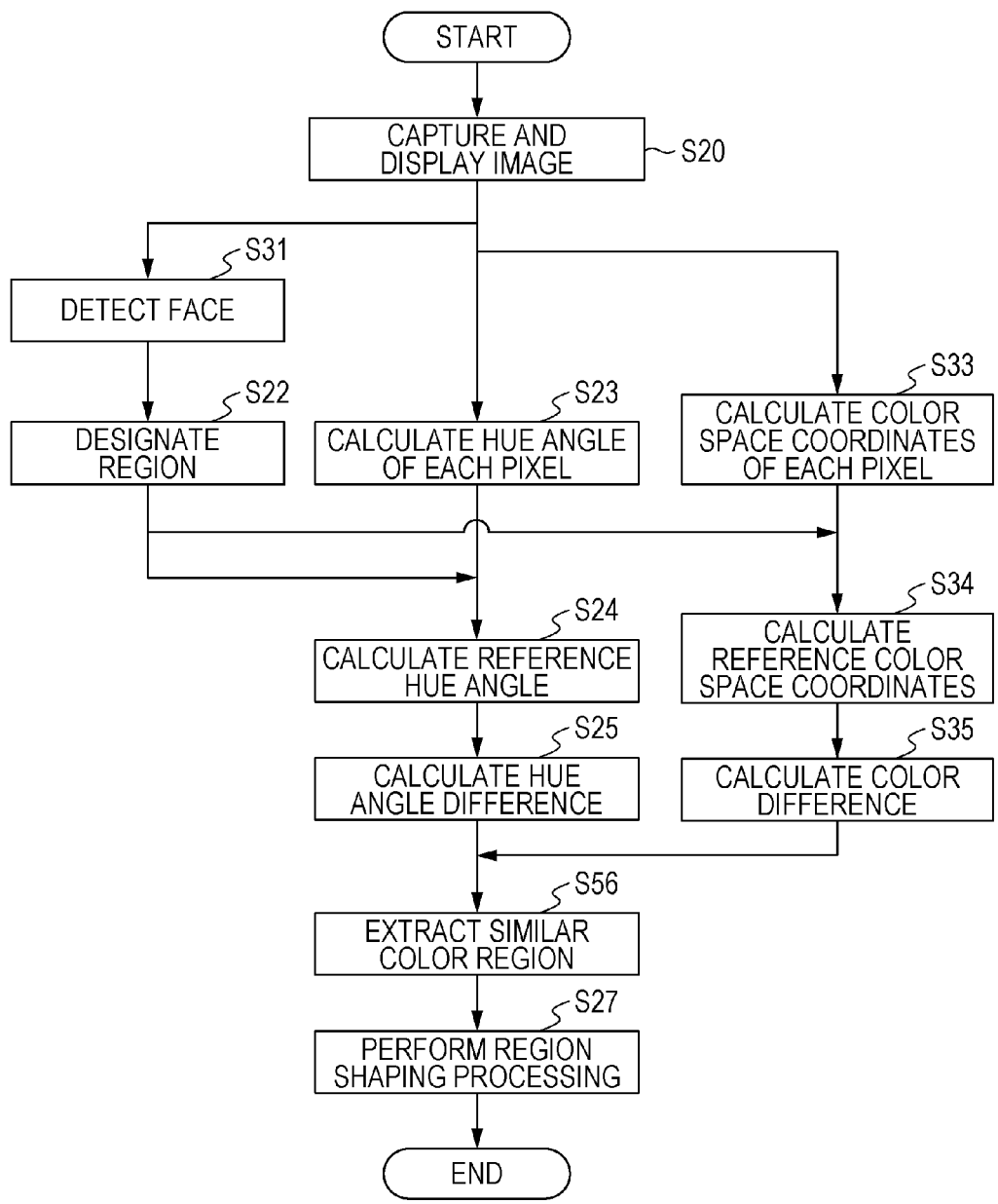
FIG. 12 is a flowchart illustrating another example of the image processing method according to the fourth embodiment.

As another example, an image processing method illustrated in FIG. 12 may be used. In this method, a similar color region is extracted based on the difference between the reference hue angle and the hue angle calculated in processing S25 and based on the color difference between the reference color space coordinates and the color space coordinates calculated in processing S35 (S56), without extracting a hue angle region and a color space region. More specifically, the region extracting unit 134 extracts, from the image, a similar color region where pixels or small regions in which the difference between the reference hue angle and the hue angle falls within the above-mentioned first range and pixels or small regions in which the color difference between the reference color space coordinates and the color space coordinates falls within the second range overlap.

Fifth Embodiment

A fifth embodiment differs from the third embodiment in that a similar color region is extracted by using a chromaticness index along with a hue angle, instead of color space coordinates. Hereinafter, parts different from the third embodiment will be mainly described.

Figure 13:
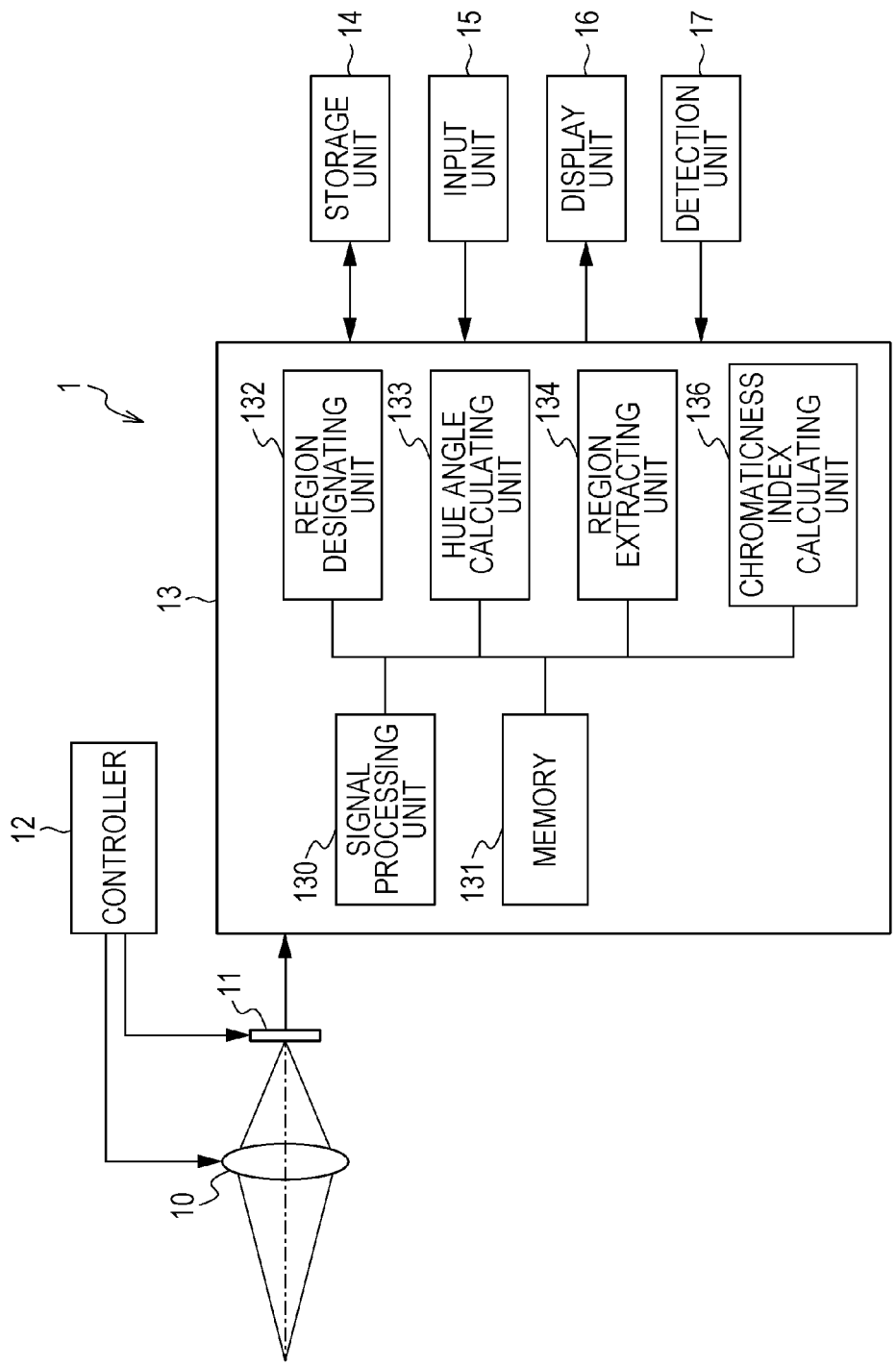
FIG. 13 illustrates an example of an imaging apparatus including an image processing device according to a fifth embodiment.

FIG. 13A illustrates a schematic configuration of the imaging apparatus 1 including the image processing device 13 according to the fifth embodiment. The imaging apparatus 1 according to the fifth embodiment includes, in addition to the components of the imaging apparatus 1 according to the third embodiment, a chromaticness index calculating unit 136, instead of the color space coordinates calculating unit 135. The chromaticness index calculating unit 136 calculates a chromaticness index of each pixel or each small region within an image, and calculates a reference chromaticness index of a specific region based on the calculated chromaticness index. The chromaticness index calculating unit 136 includes, in addition to the first extracting part (not illustrated), a third extracting part configured to extract a chromaticness index region consisting of pixels or small regions in which the difference between the reference chromaticness index and the chromaticness index falls within the third range.

Figure 14:
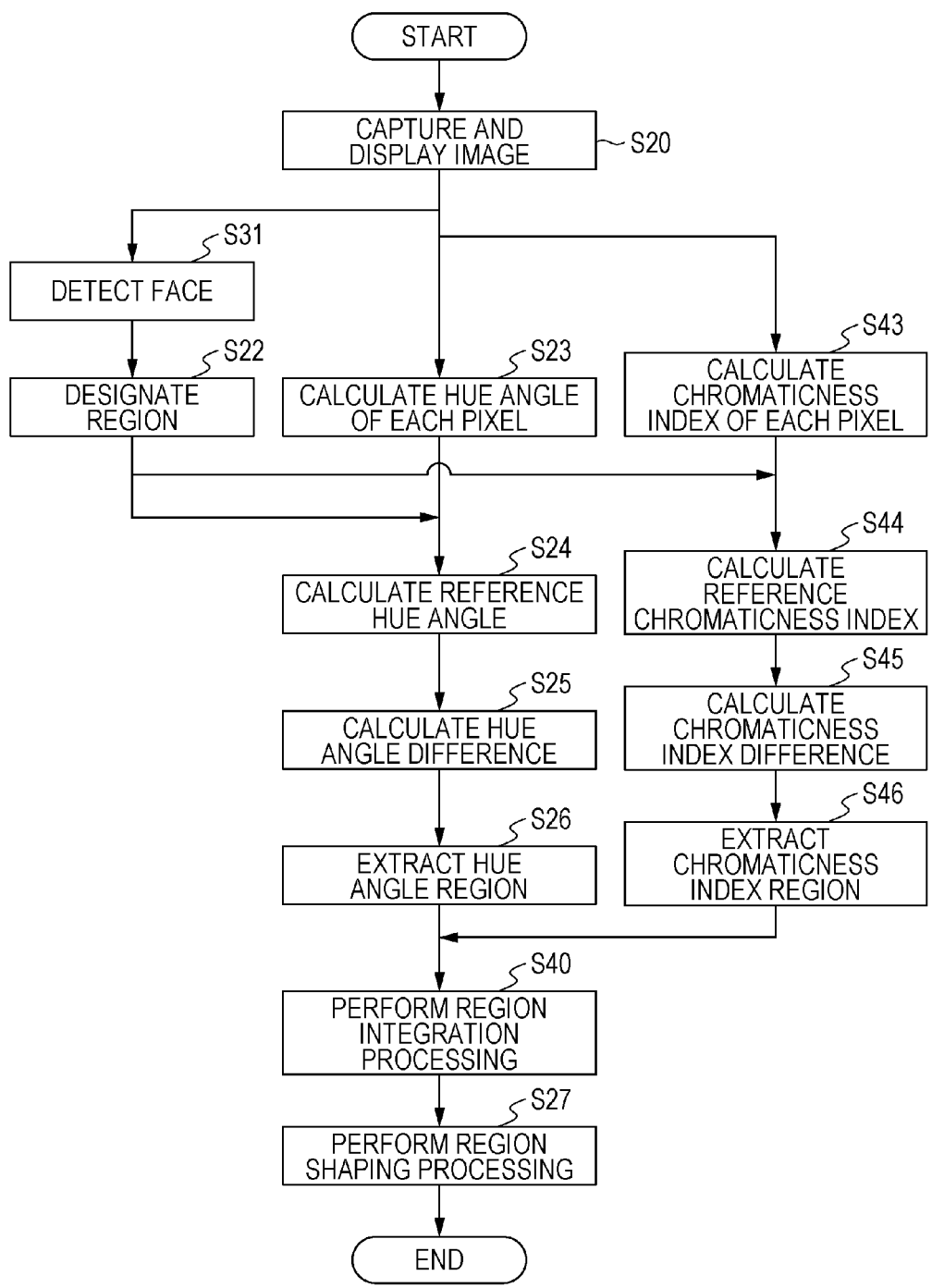
FIG. 14 is a flowchart illustrating an example of an image processing method according to the fifth embodiment.

An image processing method according to the fifth embodiment will be described below with reference to FIG. 14. In the image processing method according to the fifth embodiment, description of processing S31 and S22 to S26 will be omitted as they are the same as those in the second embodiment.

The chromaticness index calculating unit 136 calculates a chromaticness index a* or b* of each pixel or each small region from an image input in processing S20 (S43). In the description provided below, a chromaticness index a* is used. However, a chromaticness index b* may be calculated instead. The chromaticness index calculating unit 136 calculates a reference chromaticness index a* of pixels or small regions of the specific region designated in processing S22 (S44).

The third extracting part of the region extracting unit 134 obtains the chromaticness index a* difference based on the reference chromaticness index a* and the chromaticness index a* of each pixel or each small region (S45). Then, the third extracting part extracts, as a chromaticness index region, a collective region of pixels in which the chromaticness index a* difference falls within the third range (S46). A range where the absolute value of the difference between the reference chromaticness index and the chromaticness index is smaller than or equal to 20 is defined as the third range.

The region extracting unit 134 performs region integration processing for extracting, as a similar color region, a region where the hue angle region extracted in processing S26 and the chromaticness index region extracted in processing S46 overlap (S40). Furthermore, the region extracting unit 134 performs region shaping processing such as filling in a void (S27).

Figure 15:
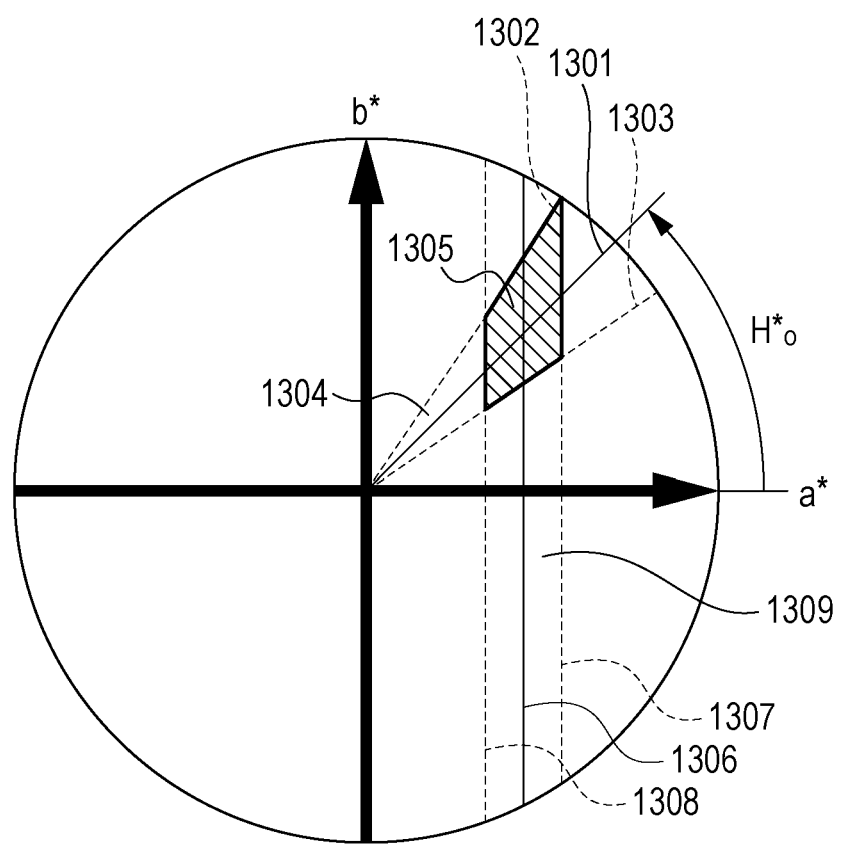
FIG. 15 illustrates a three-dimensional color space and a similar color region according to the fifth embodiment.

A three-dimensional color space and a detection range of a similar color region according to the fifth embodiment will be described with reference to FIG. 15. FIG. 15 illustrates an a*b* sectional view at a lightness index L* in the L*a*b* color system.

In the reference hue angle calculation processing (S24) according to the fifth embodiment, a reference hue angle is calculated from the designated region designated in the region designation processing (S22). The reference hue angle is represented as H*$_o$ in FIG. 15, and indicates a color space on a plane including a line 1301 and stretching in the direction of the axis L*.

Further, in the hue angle region extraction processing (S26), as mentioned above, a region corresponding to hue angles within the first range with respect to the reference hue angle H*$_o$ is extracted.

Meanwhile, in the reference chromaticness index a* calculation processing (S44), a reference chromaticness index a* is calculated from the designated region designated in the region designation processing (S22). The reference chromaticness index a* is expressed by a line 1306 in FIG. 15. In the similar chromaticness index a* region extraction processing (S46), pixels in which the difference between the reference chromaticness index a*$_o$ and the chromaticness index a*$_i$ of each pixel or each small region falls within the third range are extracted. Specifically, a range where the absolute value Δa* of the difference between the reference chromaticness index and the chromaticness index is smaller than or equal to 20 is defined as the third range. This range is defined as a similar chromaticness index region. The chromaticness index region in FIG. 15 is represented as a range 1309 between a line 1307, which is a*$_o$+20 with respect to the line 1306, and a line 1308, which is a*$_o$−20 with respect to the line 1306.

In the region integration processing (S40), pixels corresponding to an integration region 1305 where a collective region of pixels having hue angles within the similar hue angle range 1304 and a collective region of pixels having chromaticness indices a* within the similar chromaticness index range 1309 overlap, are extracted. In FIG. 15, the integration region 1305 is represented as an area hatched by oblique lines, and it has a three-dimensional shape in the color space.

Thus, with the use of a hue angle and a chromaticness index which represents a change from a red-based color to a green-based color for identifying a skin color, a similar color region (a region where Region (1) and Region (3) mentioned above overlap), especially a skin color region, may be extracted with high accuracy. Since a skin color is close to an orange color, a change in the skin color may be acquired precisely by using a chromaticness index, which represents a change from a red-based color to a green-based color.

In the fifth embodiment, as an example of a chromaticness index representing a change from a red-based color to a green-based color, a* in the L*a*b* color system is used. However, a* in the L*a*b* color system is not necessarily used. For, example, u* in the L*u*v* color system or the like may be used.

Sixth Embodiment

In a sixth embodiment, a difference from the fifth embodiment will be described in which a region consisting of pixels or small regions in which the difference between a reference hue angle and a hue angle falls within a desired range and in which the difference between a reference chromaticness index and a chromaticness index falls within a desired range is extracted.

Figure 16:
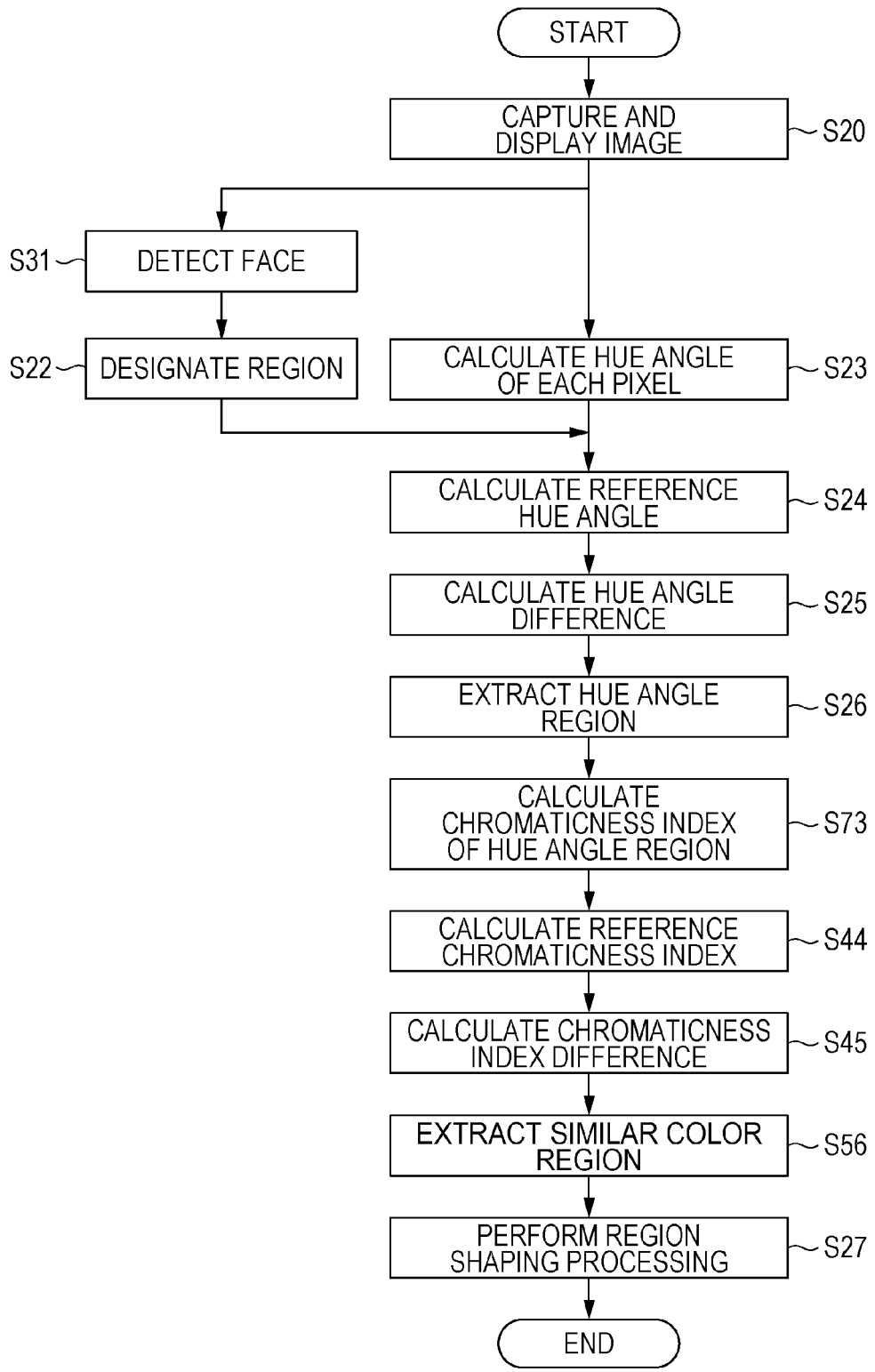
FIG. 16 is a flowchart illustrating an example of an image processing method according to a sixth embodiment.

For example, an image processing method illustrated in FIG. 16 may be used. Description of processing S20, S31, and S22 to S26 will be omitted as they are the same as those in the fifth embodiment.

Next, the chromaticness index calculating unit 136 calculates a chromaticness index of each pixel or each small region of the hue angle region extracted in processing S26 (S73), instead of a chromaticness index of each pixel or each small region within an image. Further, the chromaticness index calculating unit 136 calculates a reference chromaticness index of the hue angle region based on the chromaticness index calculated in processing S73 (S44). In this example, unlike the fifth embodiment, the chromaticness index calculating unit 136 has a function of calculating a chromaticness index of each pixel or each small region within the hue angle region and calculating a reference chromaticness index of the hue angle region based on the calculated chromaticness index.

Then, the region extracting unit 134 obtains a chromaticness index difference based on the chromaticness index of each pixel or each small region calculated in processing S73 and the reference chromaticness index calculated in processing S44 (S45). Next, the region extracting unit 134 extracts, as a similar color region, a region consisting of pixels or small regions in which the chromaticness index difference falls within the above-mentioned third range, from the hue angle region (S56). Furthermore, the region extracting unit 134 performs region shaping processing such as filling in a void (S27).

Figure 17:
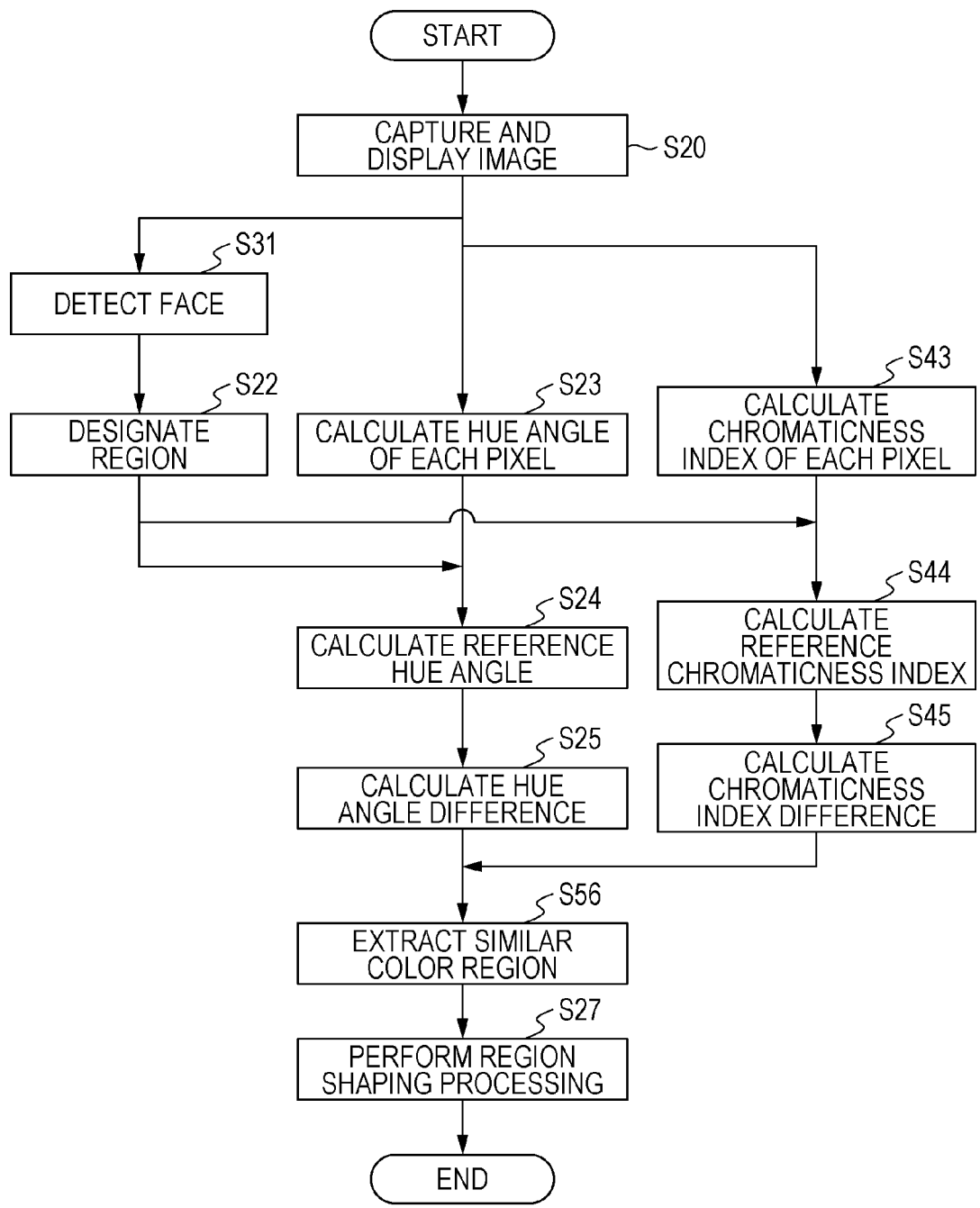
FIG. 17 is a flowchart illustrating another example of the image processing method according to the sixth embodiment.

As another example, an image processing method illustrated in FIG. 17 may be used. In this method, a similar color region is extracted based on the difference between a reference hue angle and a hue angle and the color difference in a reference chromaticness index and a chromaticness index (S56), instead of extracting a hue angle region and a chromaticness index region. Specifically, the region extracting unit 134 extracts from an image a similar color region where pixels or small regions in which the difference between the reference hue angle and the hue angle falls within the first range and pixels or small regions in which the difference between the reference chromaticness index and the chromaticness index falls within the third range overlap.

Seventh Embodiment

A seventh embodiment differs from the second embodiment in that a region obtained by excluding a dark part from an extracted hue angle region is extracted as a desired region. Hereinafter, parts different from the second embodiment will be mainly described.

Figure 18:
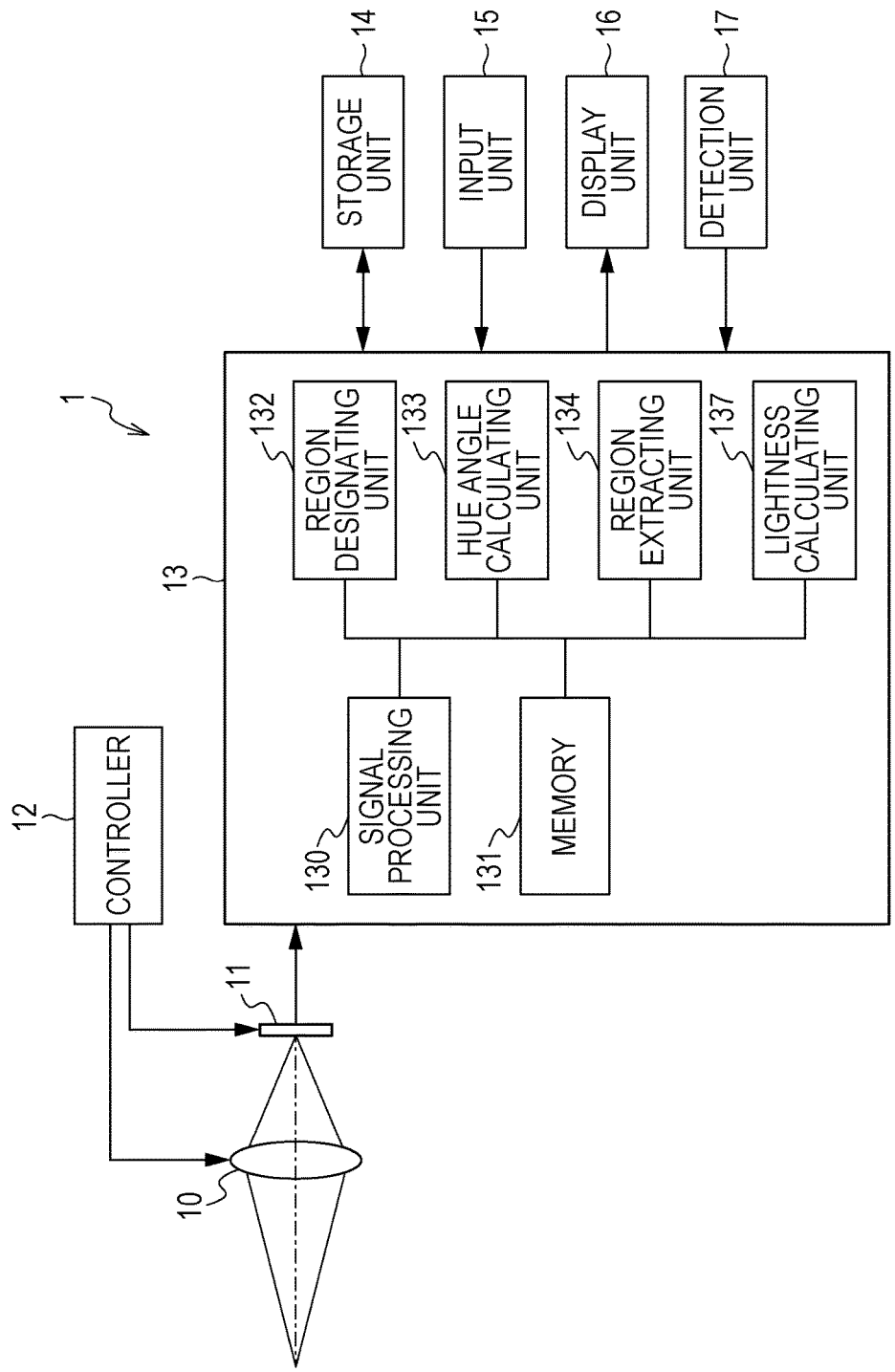
FIG. 18 illustrates an example of an imaging apparatus including an image processing device according to a seventh embodiment.

The imaging apparatus 1 according to the seventh embodiment further includes a lightness calculating unit 137, in addition to the components of the imaging apparatus 1 according to the second embodiment, as illustrated in FIG. 18. Furthermore, the region extracting unit 134 includes, in addition to the first extracting part (not illustrated), a fourth extracting part (not illustrated) configured to extract a dark part region in which the lightness of pixels and small regions within an image is lower than or equal to a desired lightness.

Figure 19:
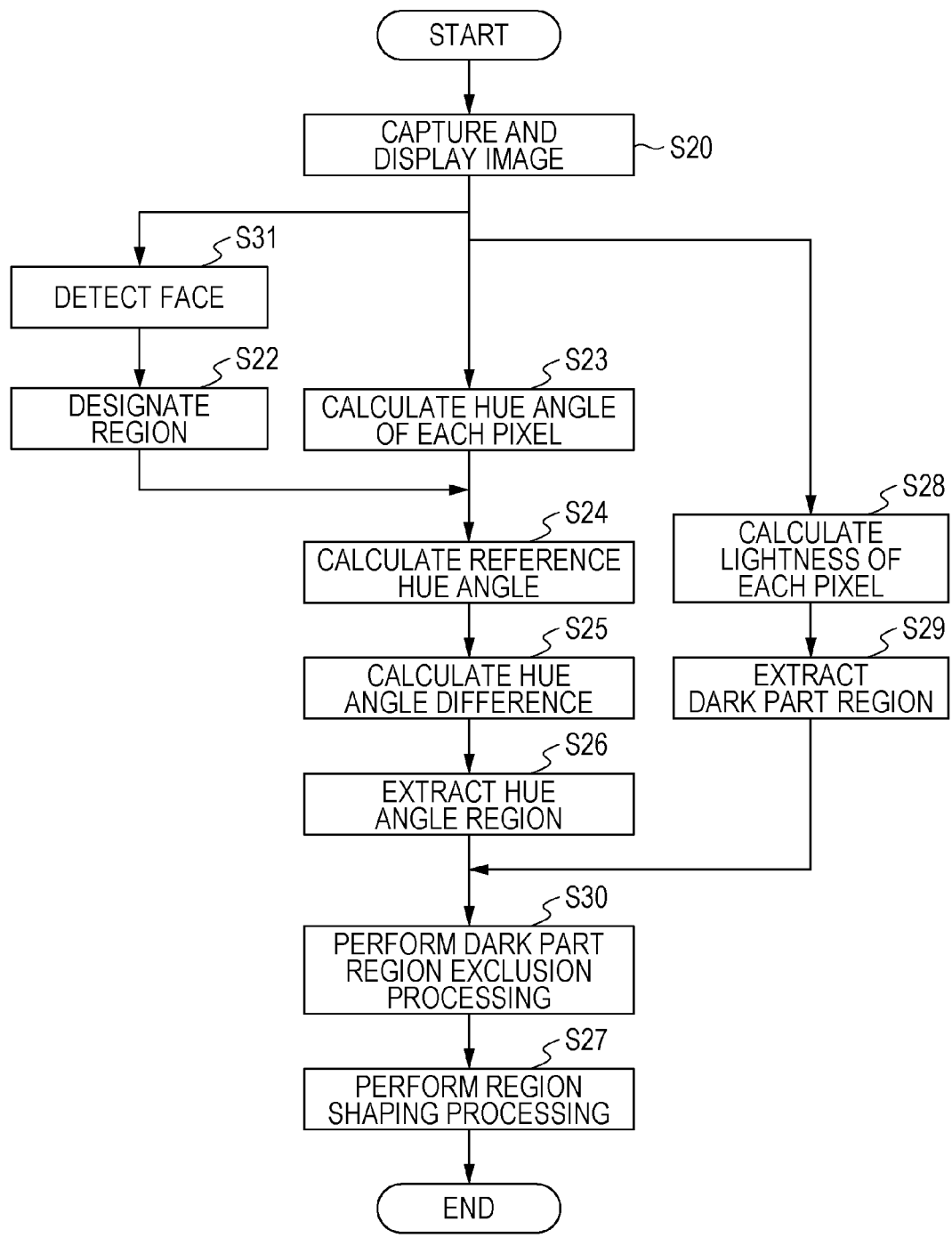
FIG. 19 is a flowchart illustrating an example of an image processing method according to the seventh embodiment.

FIG. 19 is a flowchart illustrating an image processing method according to the seventh embodiment. In the image processing method according to the seventh embodiment, the description of processing S31 and S22 to S26 will be omitted as they are the same as those in the second embodiment.

The lightness calculating unit 137 calculates the lightness of each pixel or each small region from an image captured in processing S20 (S28). Then, the fourth extracting part of the region extracting unit 134 extracts from the image a dark part region, which is a collective region of dark parts in which the lightness is lower than or equal to a specific lightness (S29).

Here, a lightness that is lower than or equal to the specific lightness represents, for example, a lightness for which a gradation level with respect to gray scales of 256 when y=2.2 is 60 or less, that is, the ratio of the lightness to the maximum lightness is 60/256 or less. More preferably, a gradation level with respect to gray scales of 256 is 80 or less, that is, the ratio of the lightness to the maximum lightness is 80/256 or less. In general, the specific lightness may be set to a lightness one-fourth of the maximum lightness. Furthermore, preferably, the specific lightness may be set to a lightness one-third of the maximum lightness.

Then, the region extracting unit 134 excludes the dark part region extracted in processing S29 from the hue angle region extracted in processing S26 to extract a similar color region (a region where region (1) and region (4) mentioned above overlap) (S30). Then, the region extracting unit 134 performs region shaping processing such as filling in a void (S27).

In a three-dimensional color space in the L*a*b* color system or the like, a chroma range extremely decreases at a bottom edge of a lightness, and it is difficult to identify objects as the same object based on a hue angle difference. In the seventh embodiment, by excluding even a region in which the difference in hue angle is similar at a bottom edge of a lightness, at which it is difficult to identify objects as the same object, from a hue angle region, a similar color region of an object may be extracted with high accuracy.

Eighth Embodiment

In the seventh embodiment, a hue angle region and a dark part region in which a lightness is lower than or equal to a specific lightness are extracted, and the dark part region is excluded from the hue angle region. An eighth embodiment will be described below in which a region where pixels or small regions in which the difference between a reference hue angle and a hue angle falls within a desired range and pixels or small regions in which the lightness is higher than a specific lightness overlap, is extracted.

Figure 20:
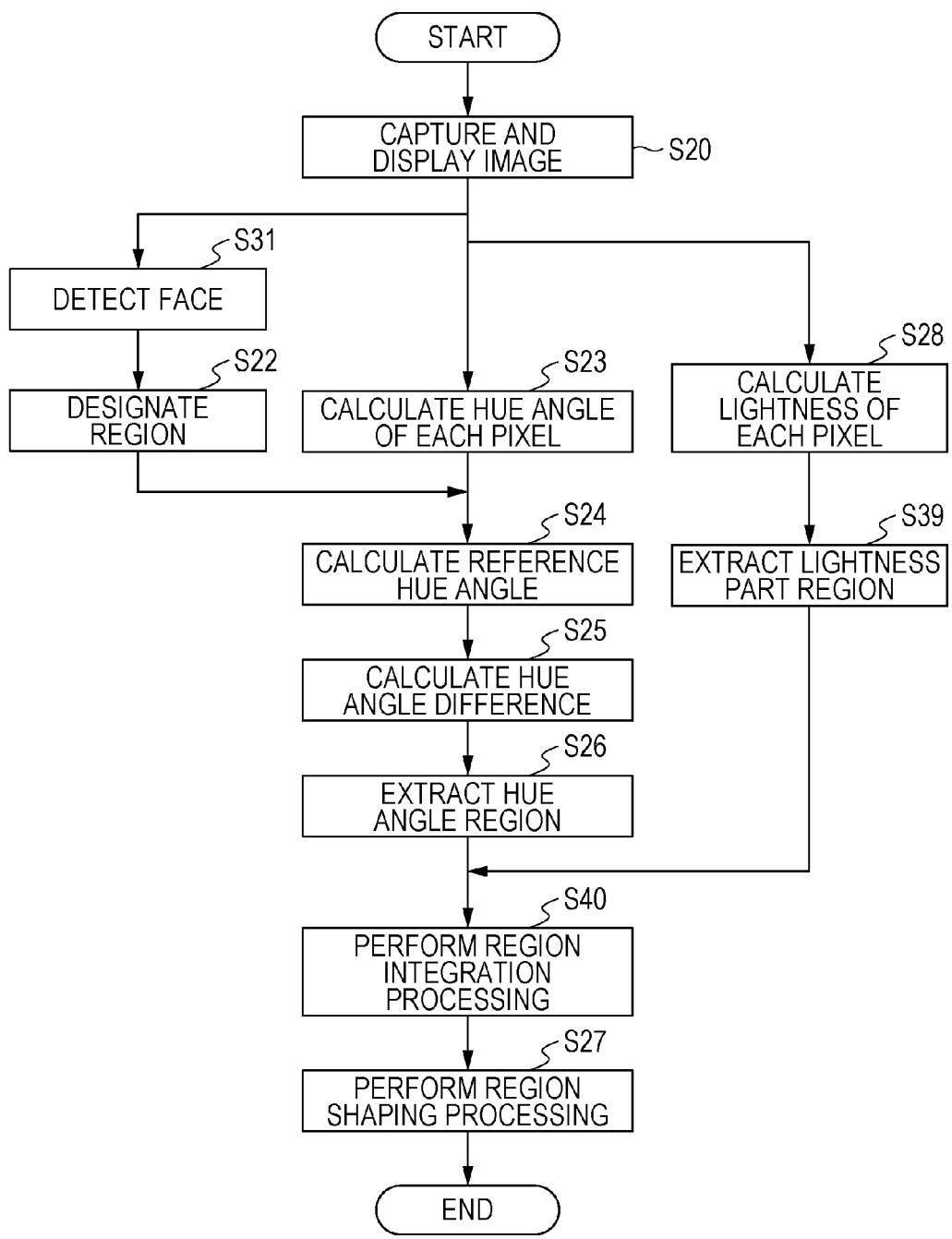
FIG. 20 is a flowchart illustrating an example of an image processing method according to an eighth embodiment.

For example, the image processing device 13 according to the eighth embodiment is configured as described below. That is, unlike the image processing device 13 according to the seventh embodiment, in the image processing device 13 according to the eighth embodiment, the region extracting unit 134 includes, in addition to the first extracting part (not illustrated), a fifth extracting part (not illustrated) configured to extract a lightness part region in which a lightness of pixels or small regions within an image is higher than a specific lightness. An image processing method illustrated in FIG. 20 may be used. Specifically, instead of processing S29 in the seventh embodiment, the fifth extracting part compares the lightness of each pixel or each small region calculated in processing S28 with the specific lightness and extracts a lightness part region (S39). Then, the region extracting unit 134 perform region integration processing for extracting, as a similar color region (region where region (1) and region (5) mentioned above overlap), a region in which the hue angle region extracted in processing S26 and the lightness part region extracted in processing S39 overlap, from an image (S40). Further, the region extracting unit 134 performs region shaping processing such as filling in a void (S27). Description of processing S20, S31, and S22 to S26 will be omitted as they are the same as those in the seventh embodiment.

Figure 21:
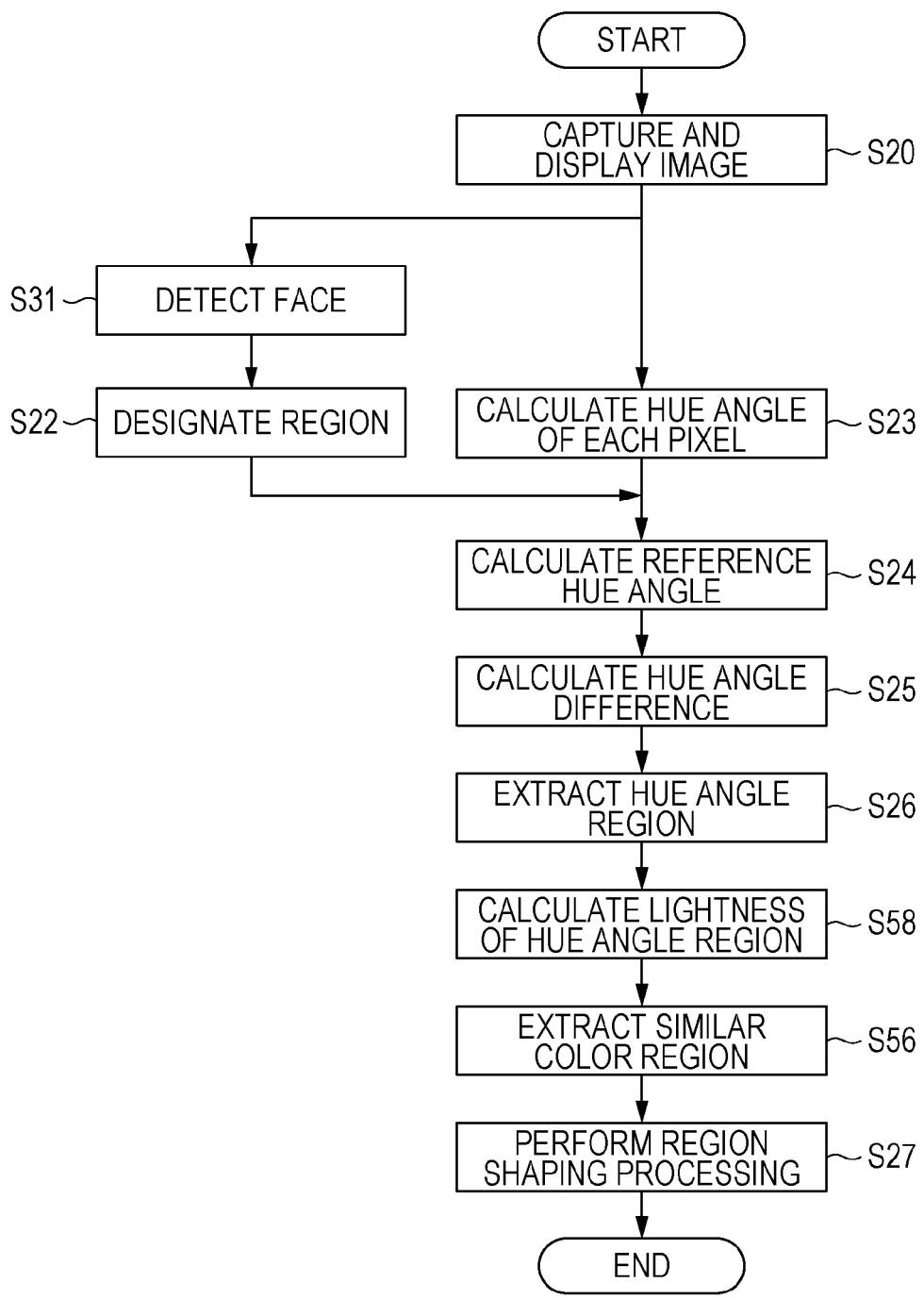
FIG. 21 is a flowchart illustrating another example of the image processing method according to the eighth embodiment.

Furthermore, an another example, an image processing method illustrated in FIG. 21 may be used. Description of processing S20, S31, and S22 to S26 will be omitted as they are the same as those in the seventh embodiment.

Next, the lightness calculating unit 137 calculates the lightness of each pixel or each small region of the hue angle region extracted in processing S26 (S58). That is, in this example, unlike the seventh embodiment, the lightness calculating unit 137 has a function of calculating the lightness of each pixel or each small region within the hue angle region.

Then, the region extracting unit 134 extracts, as a similar color region, a region in which the lightness of pixels and small regions is higher than the specific lightness, from the hue angle region (S56). Furthermore, the region extracting unit 134 performs region shaping processing such as filling in a void (S27).

Figure 22:
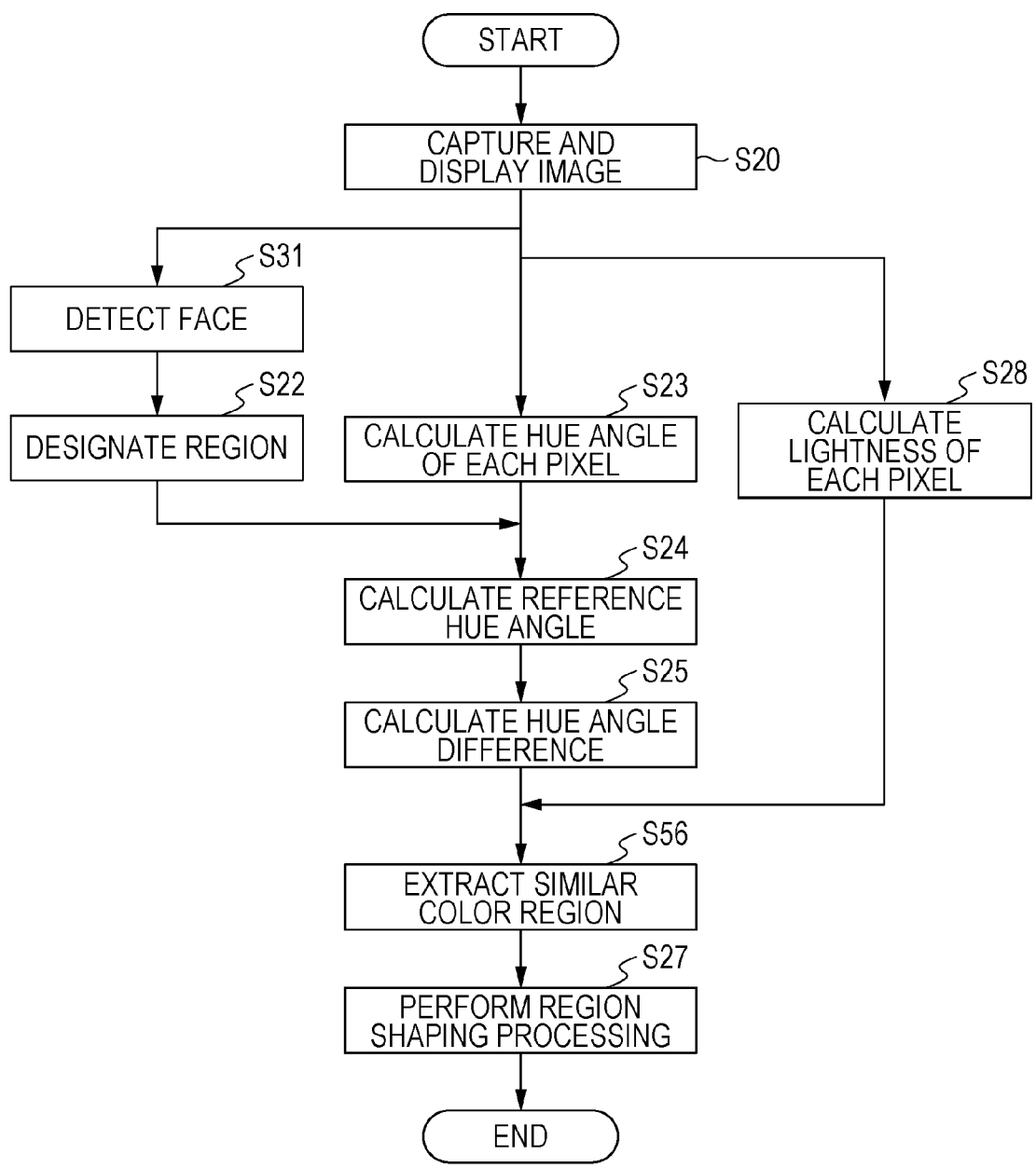
FIG. 22 is a flowchart illustrating another example of the image processing method according to the eighth embodiment.

As another example, an image processing method illustrated in FIG. 22 may be used. In this method, a similar color region is extracted based on the difference between a reference hue angle and a hue angle and a lightness, instead of extracting a hue angle region and a lightness part region (S56). More specifically, the region extracting unit 134 extracts from an image a similar color region where pixels or small regions in which the difference between the reference hue angle and the hue angle falls within the first range mentioned above and pixels or small regions in which the lightness is higher than the specific lightness overlap.

Ninth Embodiment

In a ninth embodiment, a face and neck region is extracted by using a result of extraction of a similar color region according to the third embodiment and a newly set face and neck mask.

Figure 23:
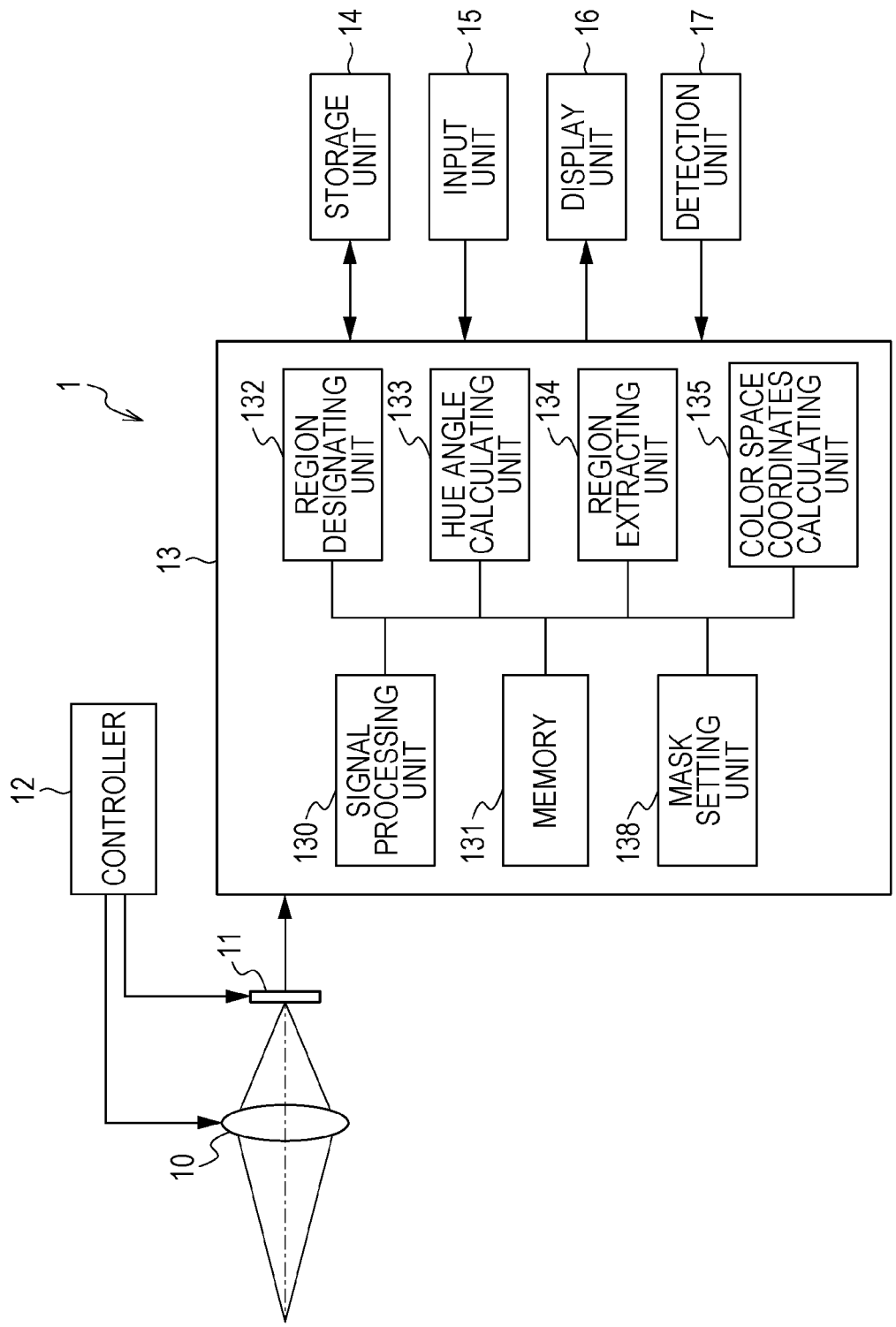
FIG. 23 illustrates an example of an imaging apparatus including an image processing device according to a ninth embodiment.

FIG. 23 illustrates a schematic configuration of the imaging apparatus 1 including the image processing device 13 according to the ninth embodiment. The image processing device 13 includes, in addition to the components in the third embodiment, a mask setting unit 138. The mask setting unit 138 has a function of setting a mask including a specific portion or object based on a result of detection of the specific portion or object by the detection unit 17. A specific portion or object represents a person, a face, a neck, a chest part, an arm, a body, a head, a leg, an animal, a plant, or the like. In the imaging apparatus 1 according to the ninth embodiment, a specific portion or object represents a face and neck mask including a region consisting of the face, neck, and chest part of a human.

In the image processing method according to the third embodiment, for example, in the case of extraction of the face and neck of a human as a similar color region from an image, if the image includes a tree trunk or branch, the tree trunk or branch may also be extracted as a skin color region. This is because it is difficult to discriminate the color of a tree trunk or branch from the color of the face and neck of a human only based on color information. In the ninth embodiment, the mask setting unit 138 sets a mask (for example, a face and neck mask) including a specific portion or object in order that parts other than the specific portion or object are not extracted as a similar color region.

Figure 24:
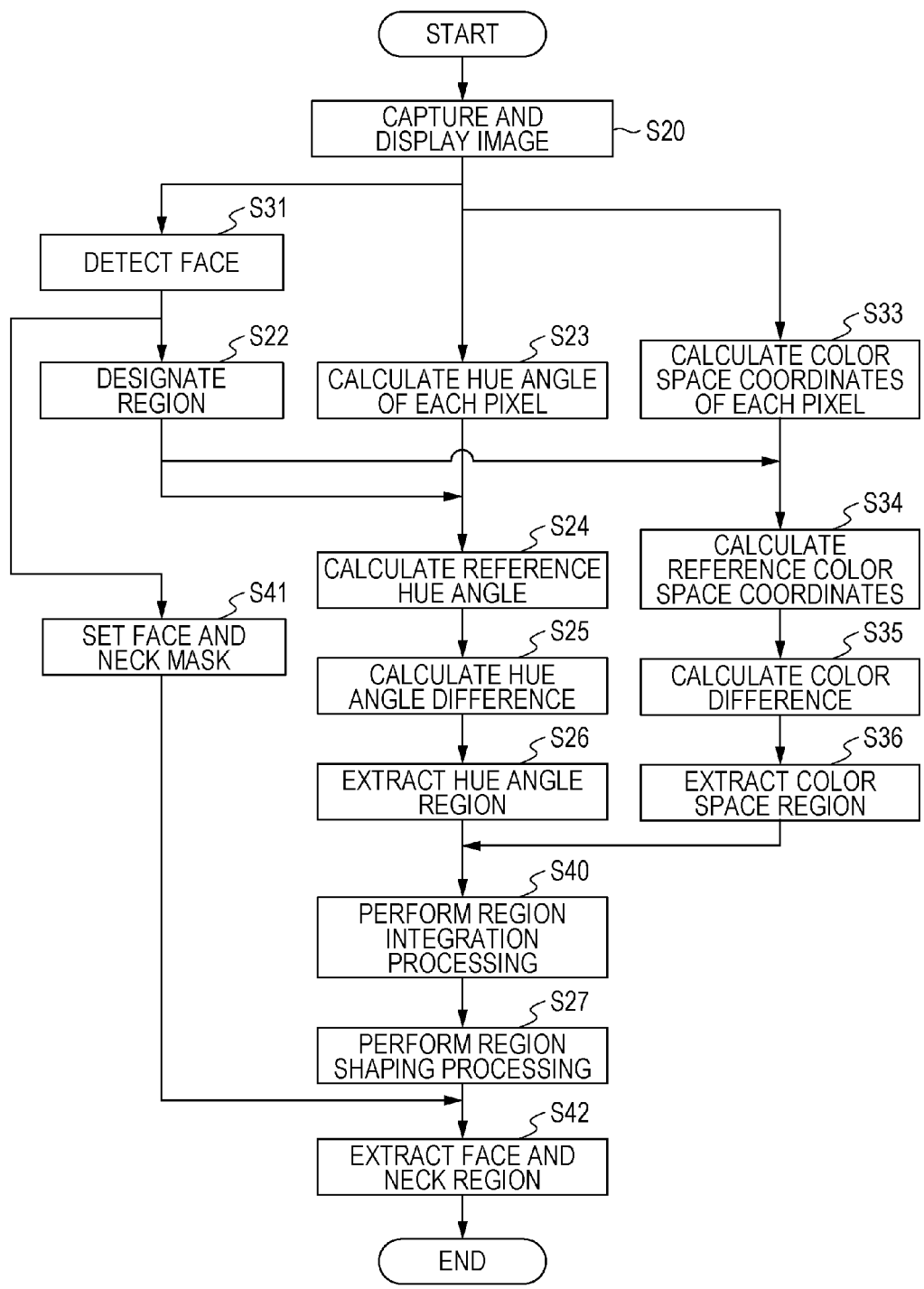
FIG. 24 is a flowchart illustrating an example of an image processing method according to the ninth embodiment.
Figure 25A:
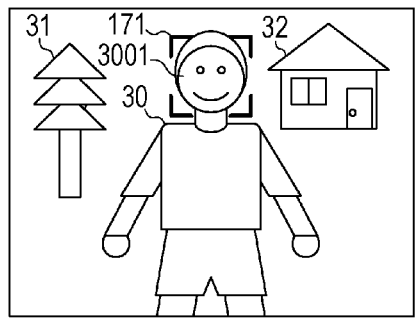
FIGS. 25A, 25B, 25C, 25D, and 25E illustrate designation of a region and extraction of a similar color region according to the ninth embodiment.
Figure 25D:
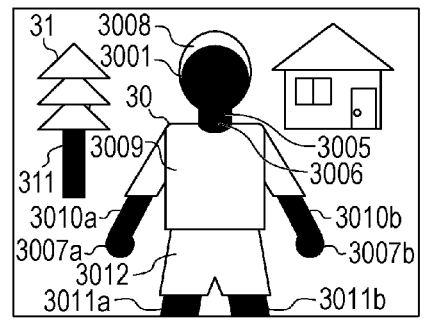
Figure 25B:
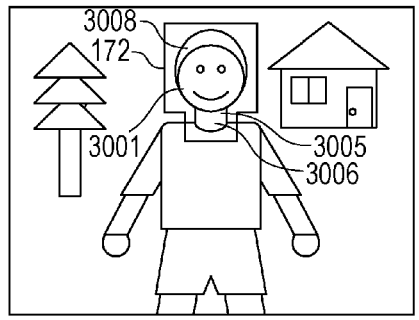
Figure 25E:
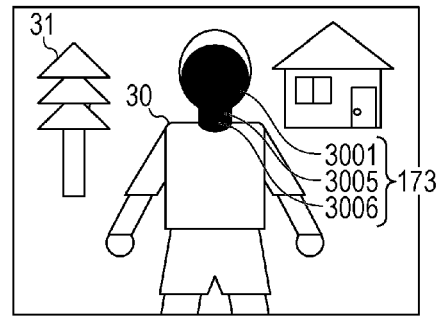
Figure 25C:
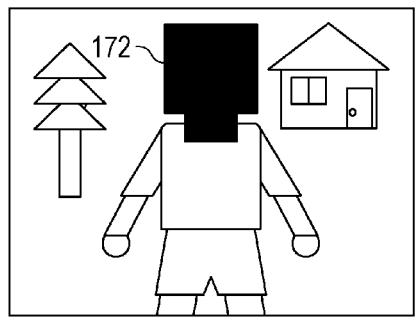

An image processing method according to the ninth embodiment will be explained with reference to FIGS. 24, 25A, 25B, 25C, 25D, and 25E. FIG. 24 is a flowchart illustrating the image processing method according to the ninth embodiment. FIG. 25A illustrates a face detection result of an acquired image. The person 30, the tree 31, and the house 32 are included in the image illustrated in FIG. 25A. FIG. 25B illustrates the frame of a face and neck mask. FIG. 25C illustrates the face and neck mask. FIG. 25D illustrates a skin color region of an object. FIG. 25E illustrates an extraction result of a face and neck region.

Description of processing S20, S31, S22 to S27, S33 to S36, S40, and S27 will be omitted as they are the same as those in the third embodiment. Face detection is performed in the face detection processing (S31). As a result, a face detection frame 171 is displayed on the display unit 16 so as to include a face 3001, as illustrated in FIG. 25A.

Then, the mask setting unit 138 sets a face and neck mask which covers a region greater than the actual face, neck, and chest part, based on the face detection result (the position coordinates, size, orientation, and the like of the face) (S41). Specifically, as illustrated in FIG. 25B, a face and neck mask 172 is set so as to include the face 3001, a neck 3005, a chest part 3006, and a head 3008. FIG. 25B illustrates the frame of the face and neck mask 172, in order to explain the range of the face and neck mask 172. The actual face and neck mask 172 is represented as a black range illustrated in FIG. 25C.

Meanwhile, when a skin color region is extracted in processing S40 as in the fifth embodiment, the result illustrated in FIG. 25D may be obtained. Specifically, in FIG. 25D, a tree trunk 311, as well as the face 3001, the neck 3005, the chest part 3006, a right hand first 3007*a*, a left hand first 3007*b*, a right arm 3010*a*, a left arm 3010*b*, a right leg 3011*a*, and a left leg 3011*b*, is extracted as a similar color region. That is, a state where the tree trunk 311 of the tree 31 is extracted as a skin color region is illustrated in FIG. 25D.

In the ninth embodiment, a meaningful mask indicating a portion associated with a specific region designated by the region designating unit 132 is used. Specifically, by face and neck region extraction processing (S42) for extracting a region where the skin color region illustrated in FIG. 25D and the face and neck mask 172 illustrated in FIG. 25C overlap, only a region consisting of the face 3001, the neck 3005, and the chest part 3006 illustrated in FIG. 25E is extracted. The region obtained here is defined as a face and neck region 173 (similar color region). In the case where a specific region designated by the region designating unit 132 is a human face, an associated portion includes the face, neck, chest part, body, head, hands, legs, fingers, and the like of a human. In the ninth embodiment, a similar color region is a region where region (1), region (2), and region (6) mentioned above overlap.

The face and neck region 173 is used, for example, for processing for extracting a face, neck, and chest part region, image processing for making skin look nice in a face and neck region, face recognition processing for identifying characteristics of a face and neck region, tracking processing for face and neck regions between frames of moving images, and the like.

In the ninth embodiment, the determination of a similar color may be performed using only a hue angle, without using color space coordinates. Furthermore, the determination of a similar color may be performed using a chromaticness index instead of color space coordinates or using both color space coordinates and a chromaticness index.

In the ninth embodiment, a region consisting of a face, a neck, and a chest part is used for a face and neck mask. However, the face and neck region is not limited to this. A region consisting of a face and a neck or a region consisting of only a face may be used. A desired region may be set according to the usage.

Tenth Embodiment

A tenth embodiment is an application example of the ninth embodiment. The imaging apparatus 1 according to the tenth embodiment differs from the ninth embodiment in that the mask setting unit 138 sets a body mask.

Figure 27A:
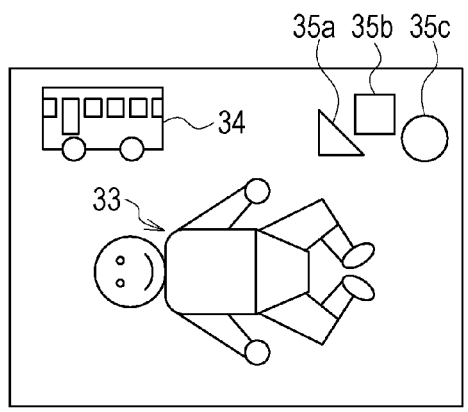
FIGS. 27A, 27B, 27C, 27D, and 27E illustrate designation of a region and extraction of a similar color region according to the tenth embodiment.
Figure 27D:
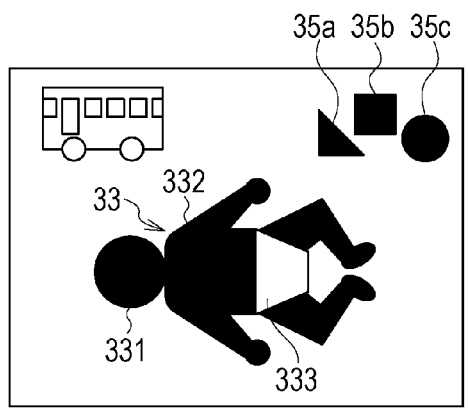
Figure 27B:
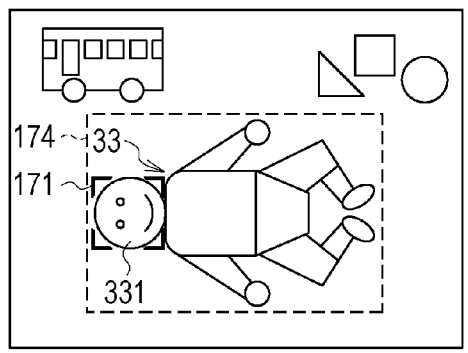
Figure 27E:
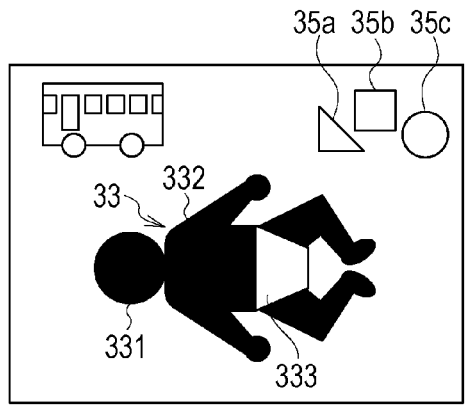
Figure 27C:
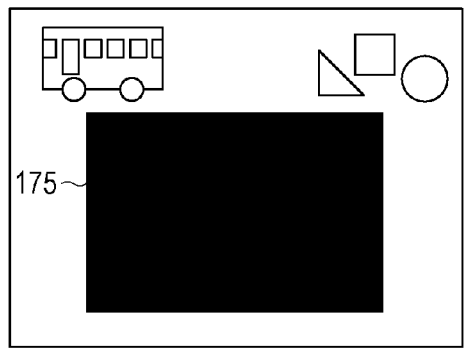

An image processing method according to the tenth embodiment will be explained with reference to FIGS. 26, 27A, 27B, 27C, 27D, and 27E. FIG. 26 is a flowchart of the image processing method according to the tenth embodiment. FIG. 27A illustrates an acquired image in which a human 33, a bus toy 34, and building blocks 35*a*, 35*b*, and 35*c* are included. FIG. 27B illustrates a face detection result and a body detection result of the acquired image. FIG. 27C illustrates a body mask. FIG. 27D illustrates a skin color region of an object. FIG. 27E illustrates a result of extraction of a skin color region of a body.

Description of processing S20, S31, S22 to S27, S33 to S36, S40, and S27 will be omitted as they are the same as those in the third embodiment.

In the tenth embodiment, as illustrated in FIG. 26, in addition to the face detection processing (S31), body detection for detecting the position coordinates, size, orientation, and the like of the body of an object from an acquired image is performed in body detection processing (S50). As a result, as illustrated in FIG. 27B, the face detection frame 171 including a face 331 and a body detection frame 174 including the whole body of the human 33 are displayed on the display unit 16. In body mask setting processing (S51), a body mask which covers a region greater than the body is set, based on the body detection result (the position coordinates, size, orientation, and the like of the body). Specifically, as illustrated in FIG. 27C, a body mask 175 is set so as to include the whole body of the human 33.

Meanwhile, when a skin color region is extracted in processing S40 as in the fifth embodiment, a result illustrated in FIG. 27D is obtained. Specifically, in FIG. 27D, the building blocks 35a, 35b, and 35c, as well as the face 331 and a body 332 of the human 33, are extracted as a skin color region. The building blocks 35a, 35b, and 35c, which are made of wood, each have a color similar to a skin color. Even though such building blocks 35a, 35b, and 35c are not desired to be included within a skin color region, they are extracted.

Thus, in the tenth embodiment, by body region extraction processing (S52) for extracting a region where the skin color region illustrated in FIG. 27D and the body mask 175 illustrated in FIG. 27C overlap, a region corresponding to exposed skin parts of the whole body of the human 33 is extracted. Specifically, as illustrated in FIG. 27E, only a body region (similar color region) consisting of the face 331 and the body 332 of the human 33 except for a diaper 333 is extracted, and the building blocks 35a, 35b, and 35c are not extracted. Accordingly, only the body region of the human 33 may be extracted. In the tenth embodiment, a similar color region is a region where region (1), region (2), and region (6) mentioned above overlap.

As described above, combining an extracted skin color region extracted based on color information of an object and a meaningful mask (for example, a face and neck mask and a body mask), a meaningful similar color region may be extracted with accuracy in units of pixels.

Furthermore, an obtained body region may be used, for example, for processing for extracting a region corresponding to exposed skin parts of the whole body, image processing for making skin of the whole body look nice, body recognition processing for identifying characteristics of a whole body region, tracking processing for whole body regions between frames of moving images, and the like.

In the tenth embodiment, although a whole body region of a human is used for a body mask. However, the body mask is not limited to this. An animal or a plant may be used, and a desired meaningful region may be set according to the usage.

In the tenth embodiment, the determination of a similar color may be performed using only a hue angle, without using color space coordinates. Furthermore, the determination of a similar color may be performed using a chromaticness index instead of color space coordinates or using both color space coordinates and a chromaticness index.

Eleventh Embodiment

In an eleventh embodiment, in an imaging apparatus which continuously photographs a plurality of images, such as moving images, by applying color information of a reference hue angle and reference color space coordinates in the ninth embodiment to the subsequent frames, a similar color region is extracted at high speed and with high accuracy in the subsequent frames.

Figure 28:
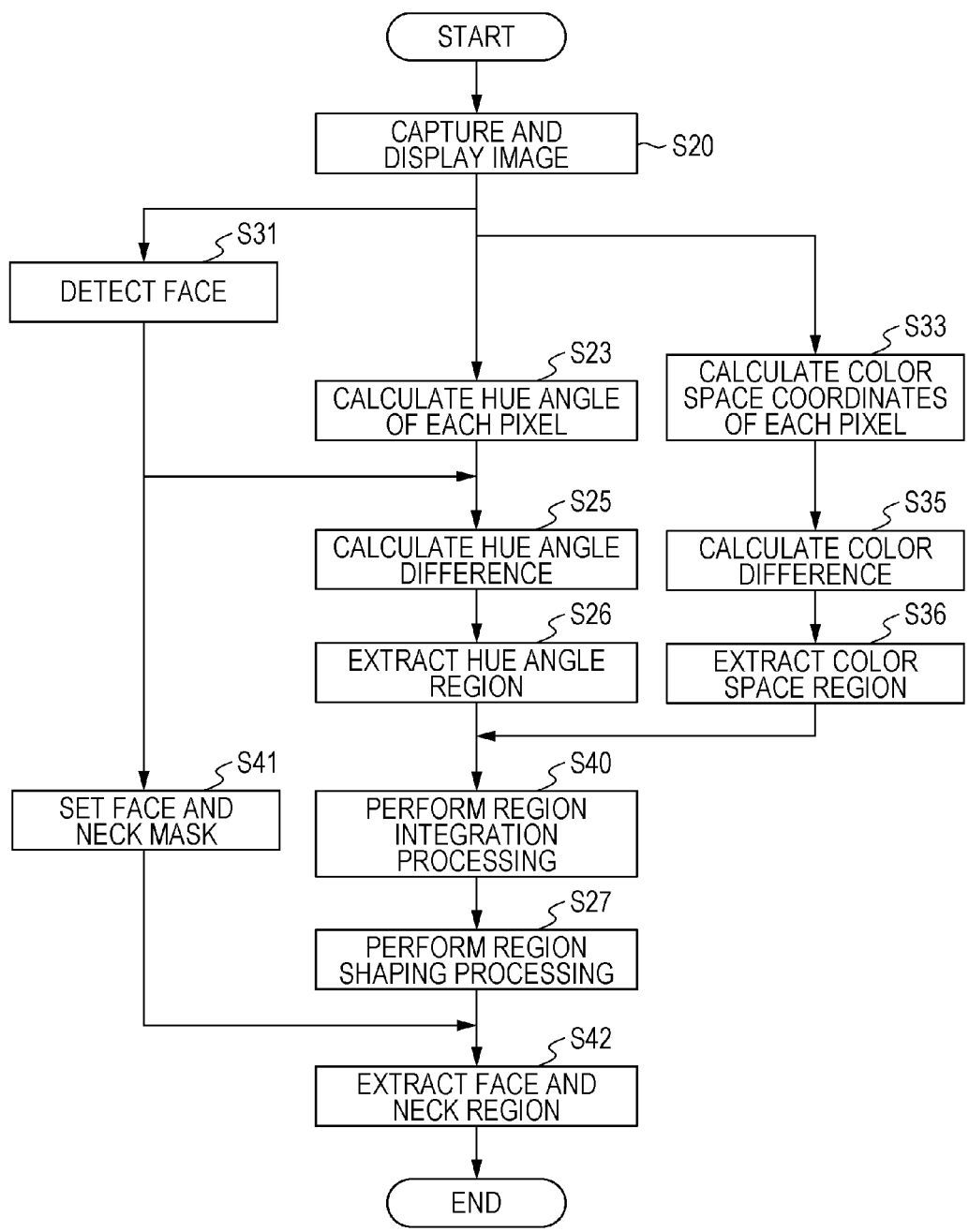
FIG. 28 is a flowchart illustrating an example of an image processing method for second and later frames, according to an eleventh embodiment.

In the image processing device according to the eleventh embodiment, the whole processing of the flowchart according to the ninth embodiment illustrated in FIG. 24 is performed for a first frame which forms a first image. Then, for a second frame which forms a second image different from the first image and later frames, a reference hue angle and reference color space coordinates calculated for the first frame are used. That is, for the second and later frames, a flowchart illustrated in FIG. 28 is performed. Accordingly, for the second and later frames, the region designation processing (S21), the reference hue angle calculation processing (S24), and the reference color space coordinates calculation processing (S34) may be omitted. Thus, image processing may be performed at high speed.

In the case of moving images having a high frame rate, lighting conditions are substantially the same among a plurality of frames, and a reference hue angle and reference color space coordinates change only a little. Therefore, even when a similar color region is calculated using a reference hue angle and reference color space coordinates calculated for a previous frame, there is no problem in extraction of a similar color region. Furthermore, by also using a face and neck mask, the outline of a face and a neck may be extracted at high speed with high accuracy.

With the face and neck region obtained here, for example, focusing on a face is maintained by tracking the face and neck region over frames of moving images. In particular, in the case of an imaging apparatus including an image sensor that is capable of grasping a focus state for each small region or each pixel, the focus state may be optimized only using a face region, without using a background. Therefore, the accuracy of autofocus may be improved. Furthermore, since a series of face region extraction processing may be performed at high speed, the time required for autofocus may be shortened.

In the eleventh embodiment, a designated region is set based on a face detection result. However, a designated region is not necessarily set based on a face detection result. A specific region may be designated based on a region focused by autofocus. In this case, the specific region is not limited to a face, and a similar color region may be extracted for any object. Thus, by setting an extracted similar color region to an autofocus region, focusing on the same object may be maintained in moving images. Therefore, autofocus tracking may be attained.

In the eleventh embodiment, the determination of a similar color may be performed using a hue angle, without using color space coordinates. Furthermore, the determination of a similar color may be performed using a chromaticness index instead of color space coordinates or using both color space coordinates and a chromaticness index.

Twelfth Embodiment

The present invention also includes a twelfth embodiment. That is, a storage or recording medium on which a program code of software implementing functions of the foregoing embodiments is stored is supplied to an image processing device. Then, a computer (or a central processing unit (CPU), a micro processing unit (MPU), or the like) of an arithmetic operation unit of the image processing device reads the program code stored in the storage or recording medium and executes the functions mentioned above. In this case, the program code itself read from the storage or recording medium implements the functions of the foregoing embodiments, and the program and the storage or recording medium storing the program constitute the present invention.

Furthermore, when the computer executes the read program code, an operating system (OS) or the like running on the computer performs part or all of the actual processing in accordance with an instruction of the program code. A case where the functions of the foregoing embodiments are implemented by the processing is also included in the present invention. Furthermore, it is assumed that the program code read from the storage or recording medium is written to a memory included in a function extension card inserted into the computer or a function extension unit connected to the computer. A case where a CPU or the like included in the function extension card or the function extension unit performs part or all of the actual processing in accordance with an instruction of the program code and the functions of the foregoing embodiments are implemented by the processing is also included in the present invention. In the case where the present invention is applied to the storage or recording medium, a program code corresponding to a flowchart described above is stored in the storage or recording medium.

An image processing device according to an embodiment of the present invention may be configured to include an integrated circuit in which semiconductor elements are integrated and may include an integrated circuit (IC), a large-scale integration (LSI), a system LSI, an MPU, a CPU, or the like. In the case where an arithmetic processing unit includes an MPU, a CPU, or the like, the arithmetic processing unit may be regarded as a computer. By installing a program according to an embodiment of the present invention into a computer of an imaging apparatus including a specific image formation optical system, a specific imaging unit, and the computer, the imaging apparatus is able to perform distance detection with high accuracy. A program according to an embodiment of the present invention may be distributed via a recording medium or the Internet.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a CPU, MPU, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-149675, filed Jul. 18, 2013, which is hereby incorporated by reference herein in its entirety.

REFERENCE SIGNS LIST 1 imaging apparatus
13 image processing device
132 region designating unit
133 hue angle calculating unit
134 region extracting unit

The invention claimed is:

1. An image processing device comprising:
at least one processor that operates to:
designate a specific region of an image;
calculate a hue angle of at least part of pixels or small regions within the image and calculate a reference hue angle within the specific region based on a hue angle of pixels or small regions within the specific region;
calculate color space coordinates of at least part of pixels or small regions within the image and calculate reference color space coordinates within the specific region based on color space coordinates of the pixels or the small regions within the specific region; and
extract a similar color region from the image, based on at least a difference between the reference hue angle and the hue angle and a color difference between the reference color space coordinates and the color space coordinates,
wherein the at least one processor operates to extract from the image the similar color region where pixels or small regions in which the difference between the reference hue angle and the hue angle falls within a first range and pixels or small regions in which the color difference between the reference color space coordinates and the color space coordinates falls within a second range.

2. The image processing device according to claim 1, wherein the second range is a range where an absolute value of the color difference between the reference color space coordinates and the color space coordinates is 45 or less, based on conversion into a CIE 1976 L*a*b* color system.

3. An image processing device comprising:
at least one processor that operates to:
designate a specific region of an image;
calculate a hue angle of at least part of pixels or small regions within the image and calculate a reference hue angle within the specific region based on a hue angle of pixels or small regions within the specific region;
calculate a chromaticness index of at least part of pixels or small regions within the image and calculate a reference chromaticness index within the specific region based on a chromaticness index of pixels or small regions within the specific region; and
extract a similar color region from the image, based on at least a difference between the reference hue angle and the hue angle and a color difference between the reference chromaticness index and the chromaticness index,
wherein the at least one processor operates to extract from the image a region where pixels or small regions in which the difference between the reference hue angle and the hue angle falls within a first range and pixels or small regions in which the difference between the reference chromaticness index and the chromaticness index falls within a third range.

4. The image processing device according to claim 3, wherein the third range is a range where an absolute value of the color difference between the reference chromaticness index and the chromaticness index is 20 or less.

5. The image processing device according to claim 1, wherein the first range is a range where an absolute value of the difference between the reference hue angle and the hue angle is 35 degrees or less, based on conversion into a CIE 1976 L*a*b* color system.

6. The image processing device according to claim 1, wherein the at least one processor further operates to:
calculate a lightness of the pixels or small regions within the image, and
wherein the at least one processor operates to extract the similar color region based on the lightness.

7. The image processing device according to claim 1, wherein the at least one processor further operates to:
set a mask corresponding to a portion associated with the specific region,
wherein the at least one processor operates to extract the similar color region based on the mask.

8. The image processing device according to claim 1, wherein the at least one processor operates to designate the specific region based on a detection result of a face region.

9. The image processing device according to claim 1, wherein the at least one processor operates to designate the specific region based on designation by a user.

10. An imaging apparatus comprising:
an image sensor; and
the image processing device according to claim 1.

11. The imaging apparatus according to claim 10, further comprising:
at least one of a sensor and a processor that operate to detect a face region.

12. An imaging apparatus comprising:
an image sensor; and
the image processing device according to claim 3.

* * * * *